Sept. 12, 1933.   J. A. V. TURCK   1,926,826
CALCULATING MACHINE
Filed May 7, 1926   17 Sheets-Sheet 1

Inventor:
Joseph A. V. Turck
By Munday Clarke & Carpenter Attys.

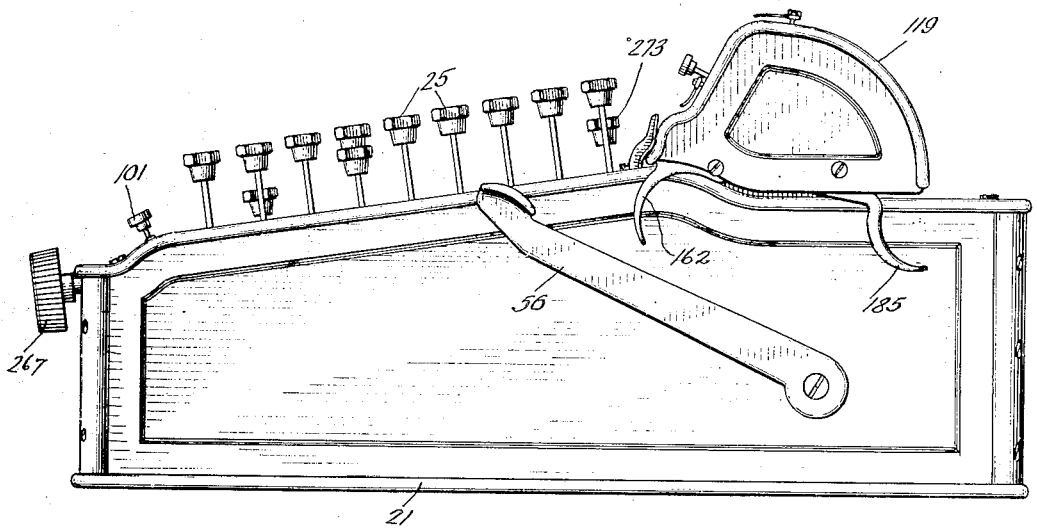
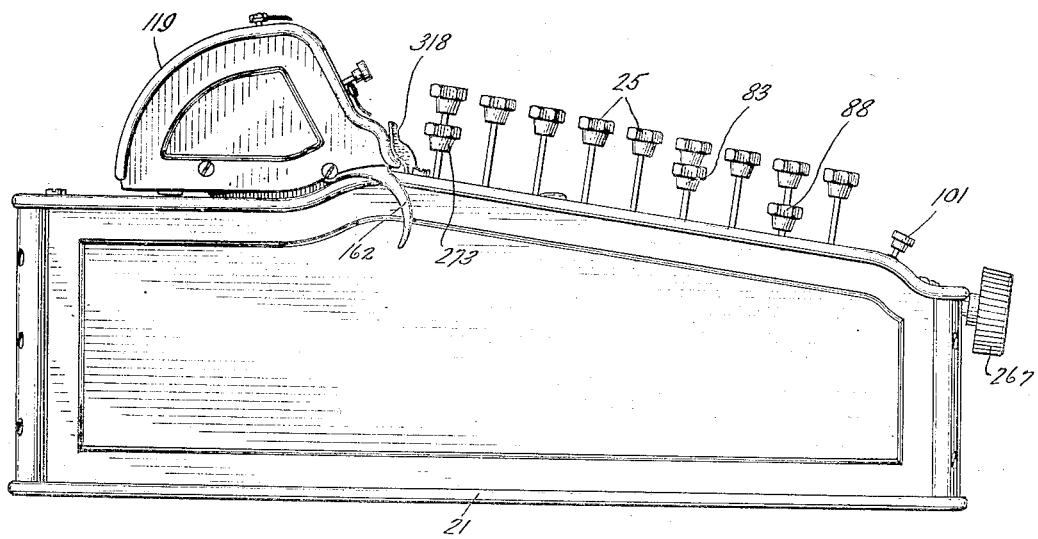

Sept. 12, 1933.　　　J. A. V. TURCK　　　1,926,826
CALCULATING MACHINE
Filed May 7, 1926　　　17 Sheets-Sheet 3
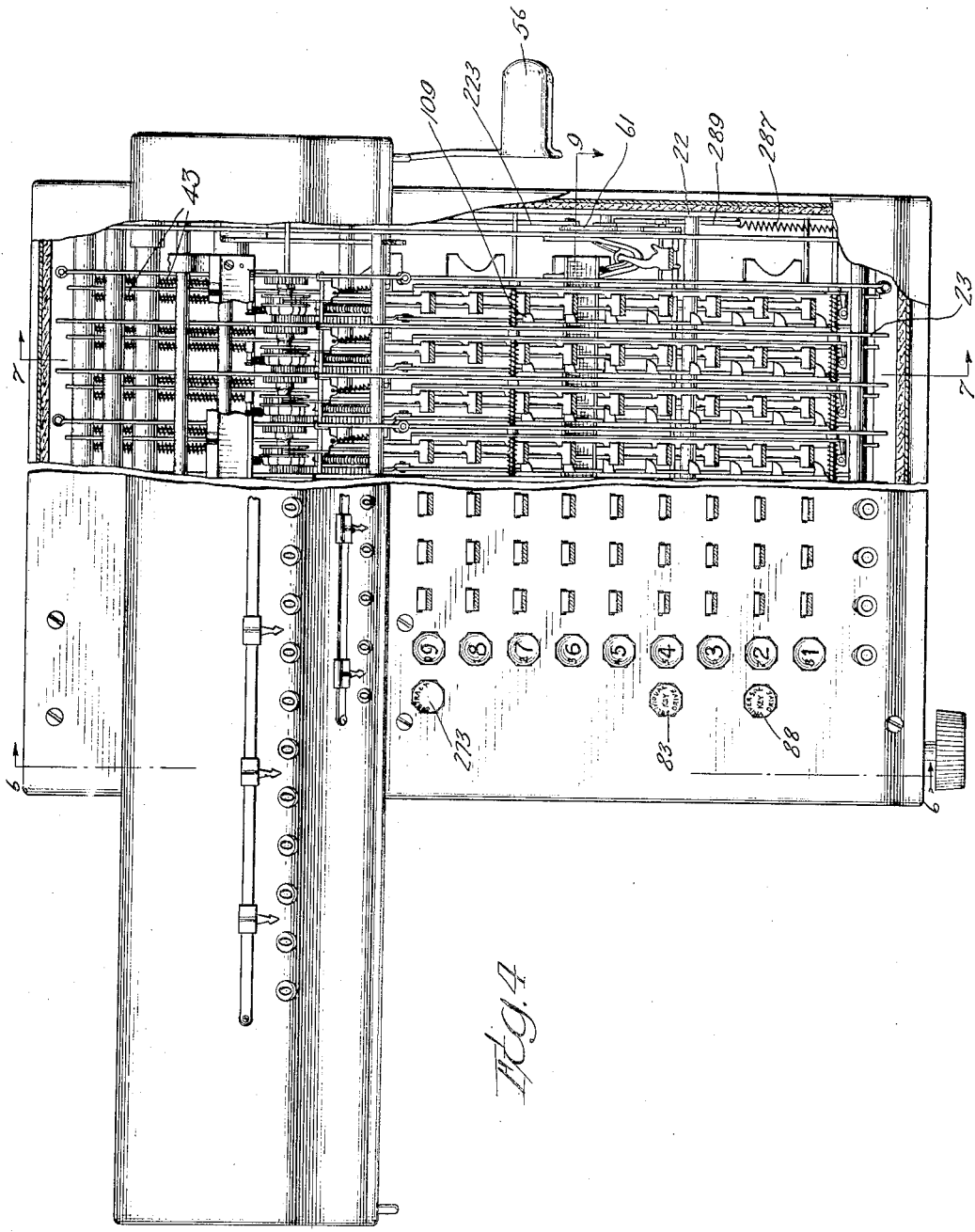

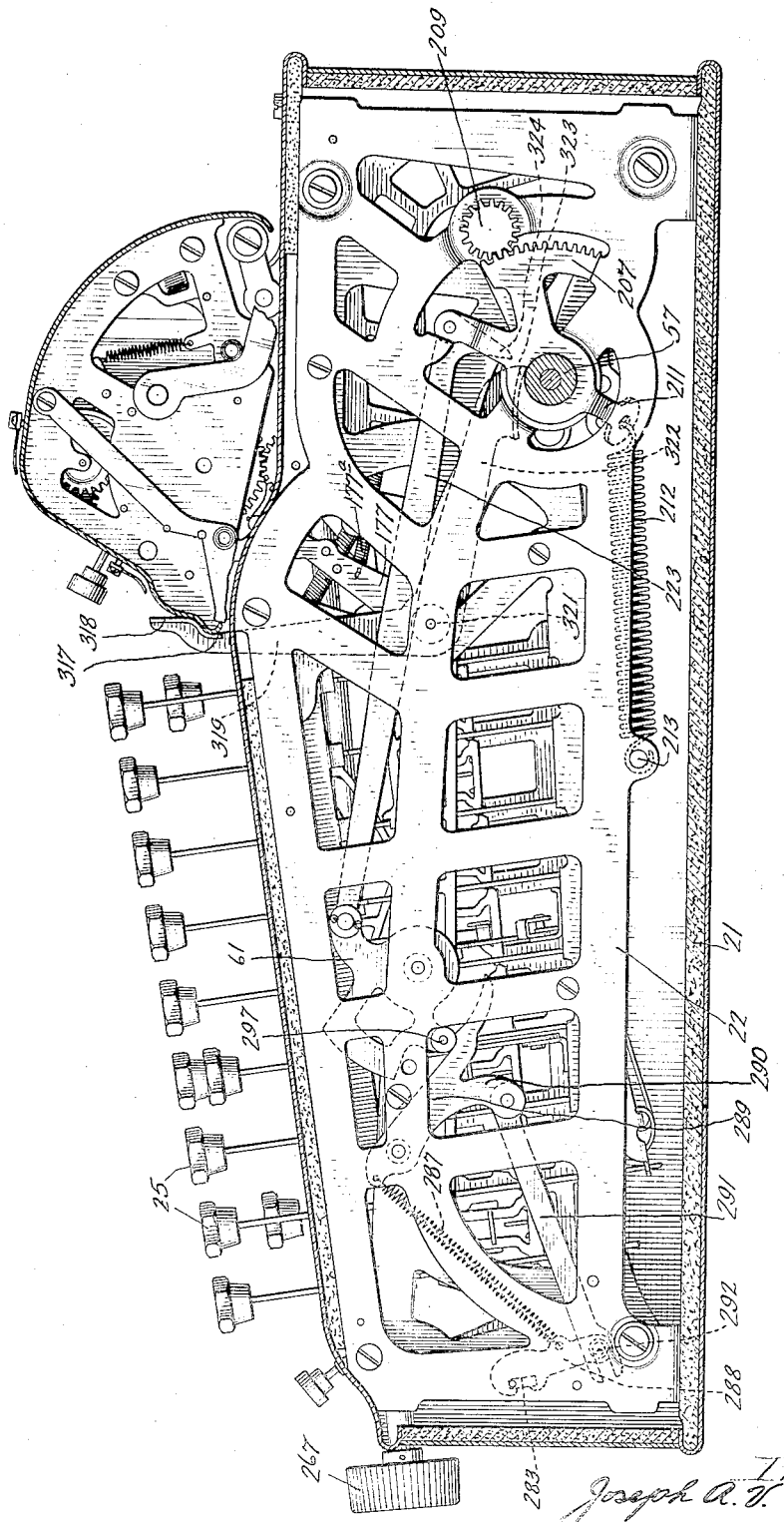

Sept. 12, 1933.　　J. A. V. TURCK　　1,926,826
CALCULATING MACHINE
Filed May 7, 1926　　17 Sheets-Sheet 5
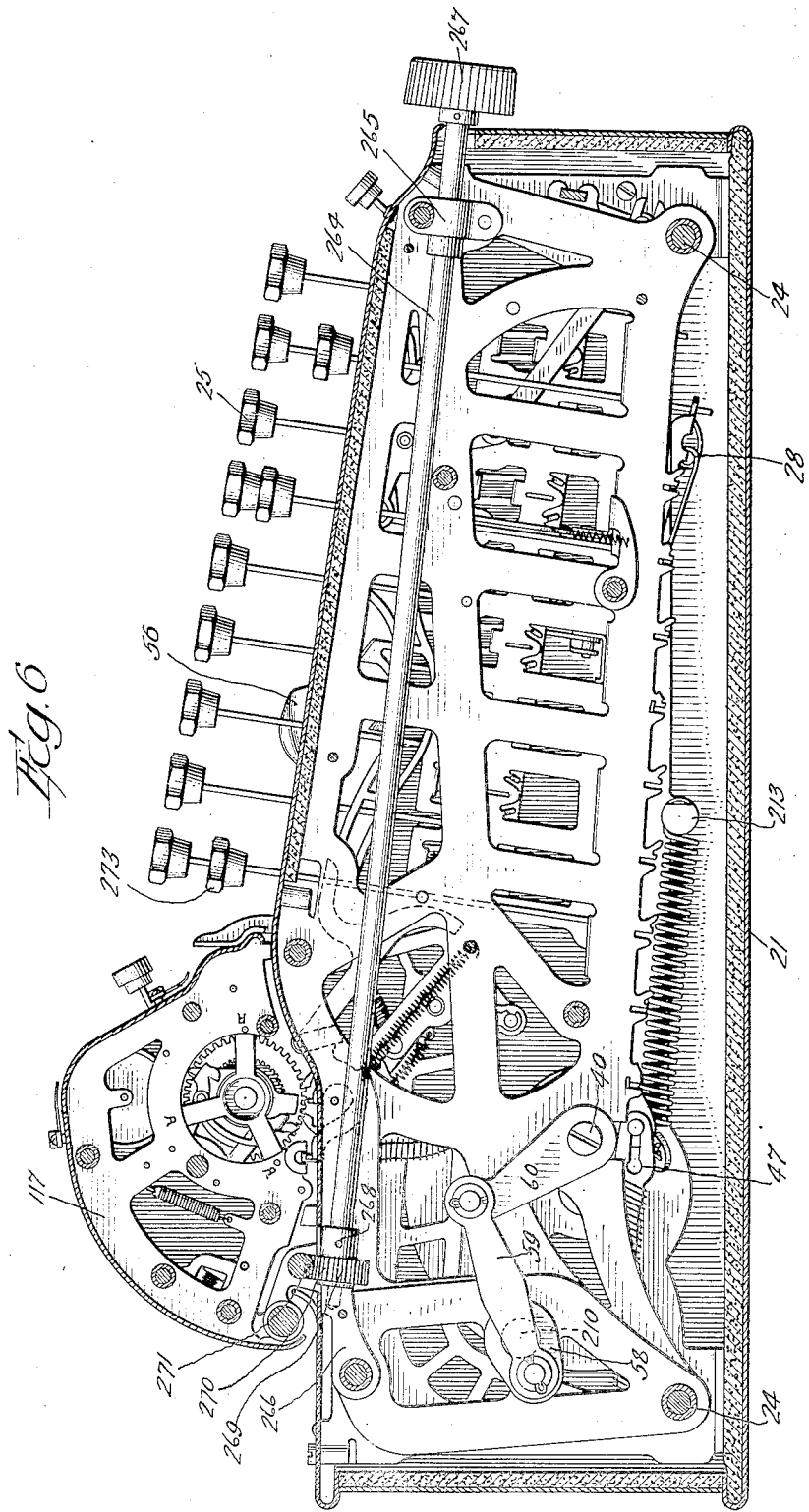

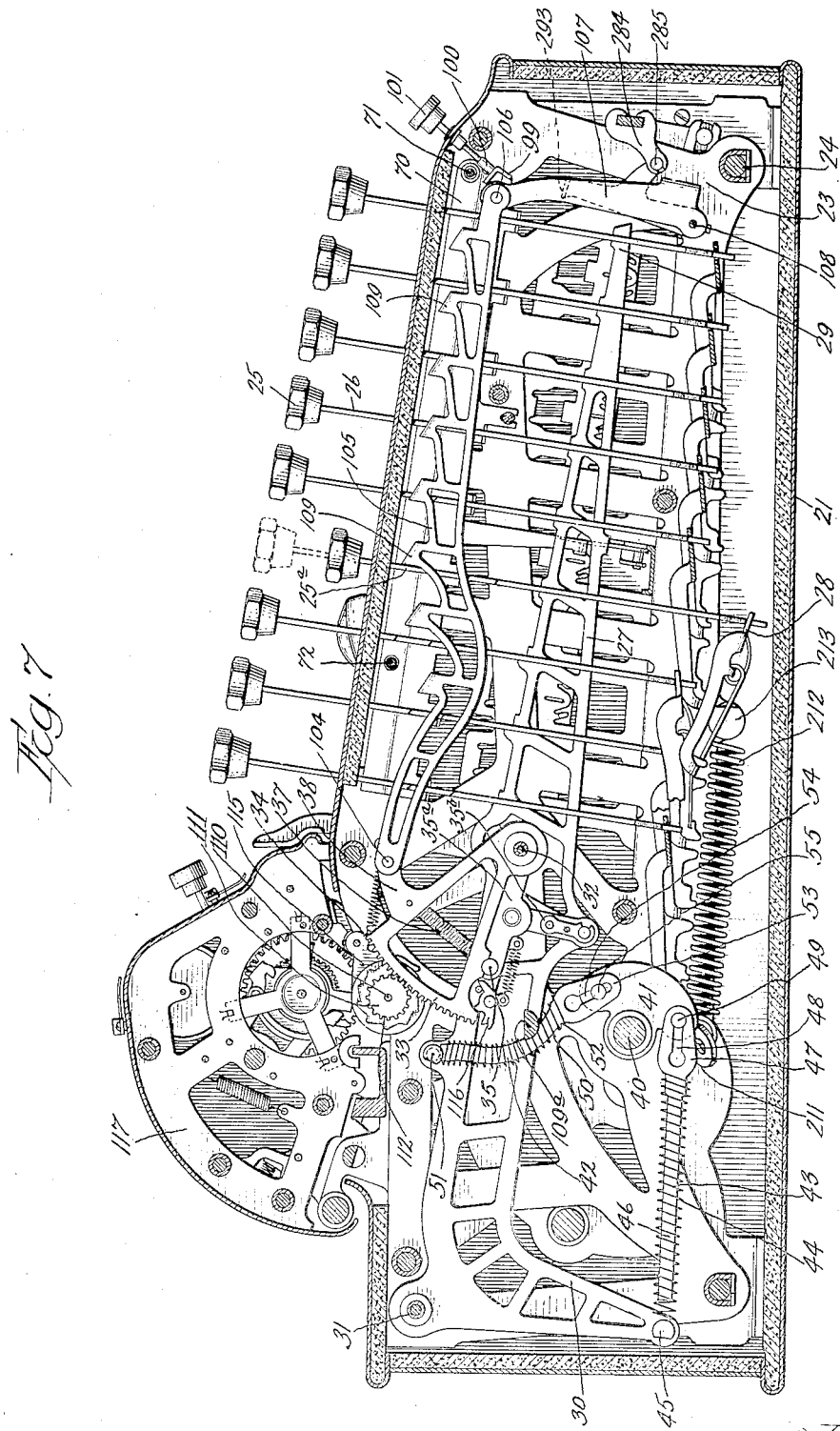

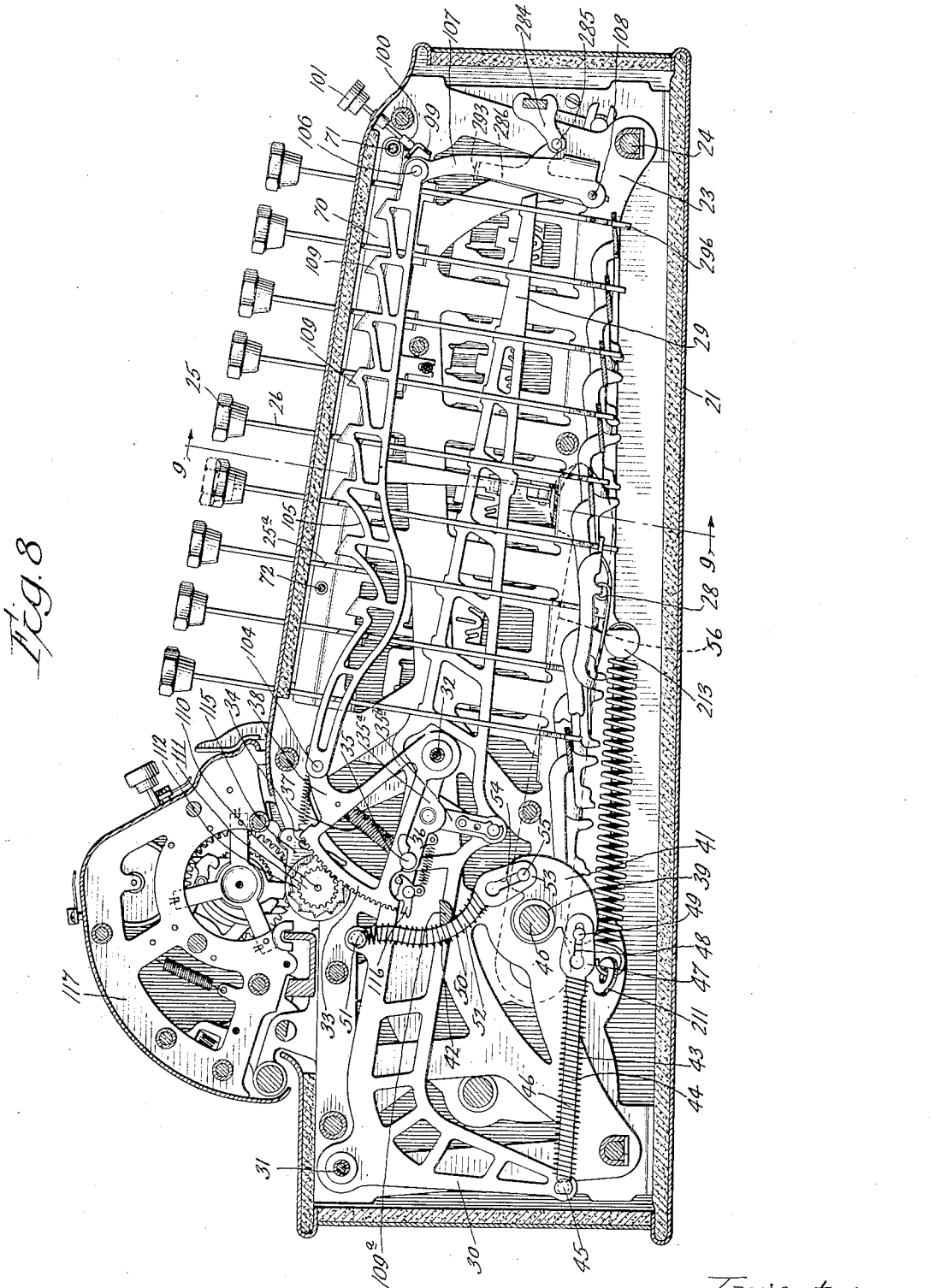

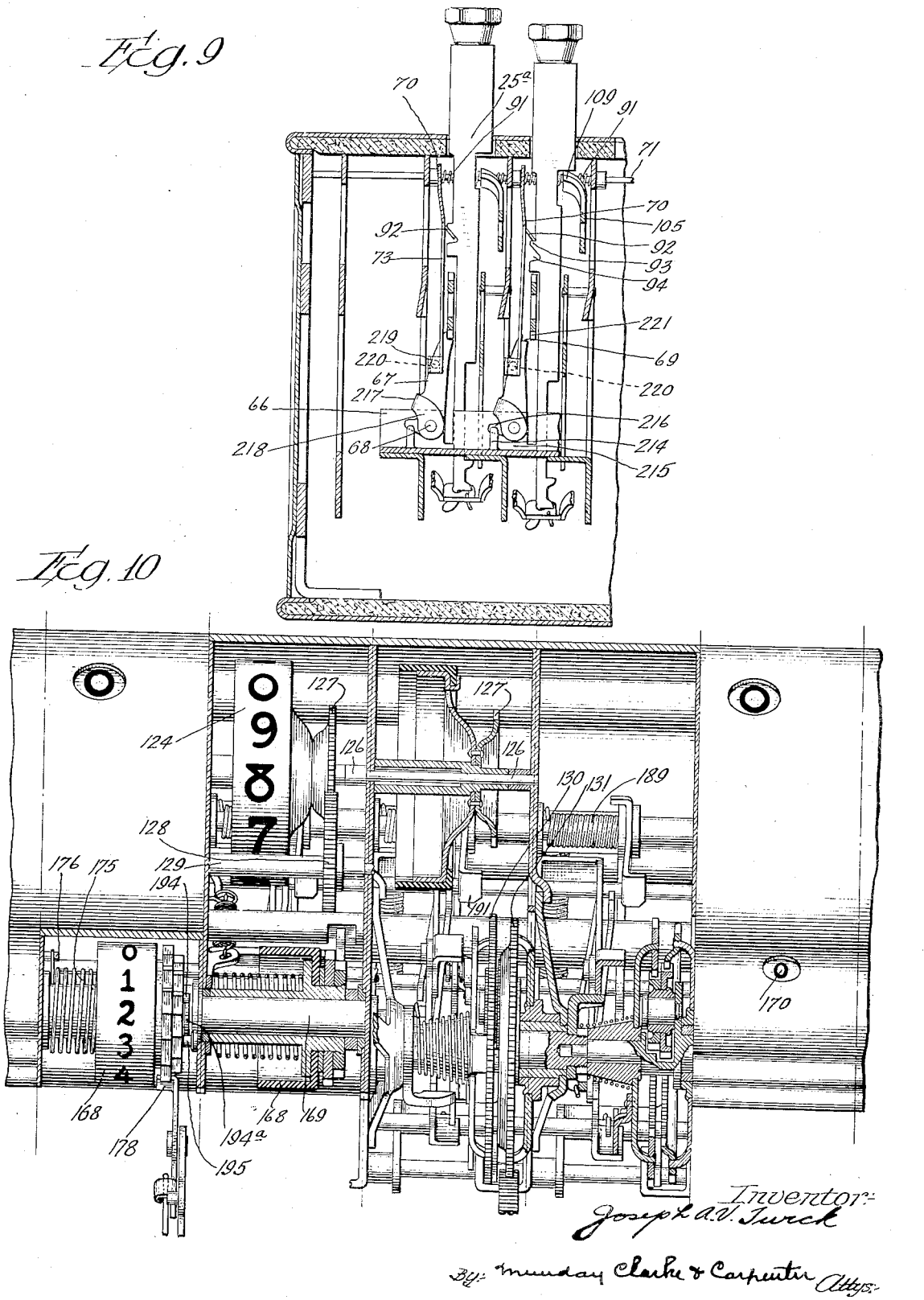

Sept. 12, 1933.    J. A. V. TURCK    1,926,826
CALCULATING MACHINE
Filed May 7, 1926    17 Sheets-Sheet 9

Inventor
Joseph A. V. Turck

By Henry Lor Clarke
Attorney

Sept. 12, 1933.  J. A. V. TURCK  1,926,826
CALCULATING MACHINE
Filed May 7, 1926    17 Sheets-Sheet 10

Sept. 12, 1933.  J. A. V. TURCK  1,926,826
CALCULATING MACHINE
Filed May 7, 1926   17 Sheets-Sheet 11

Inventor:
Joseph A. V. Turck
By Munday Clarke & Carpenter Attys.

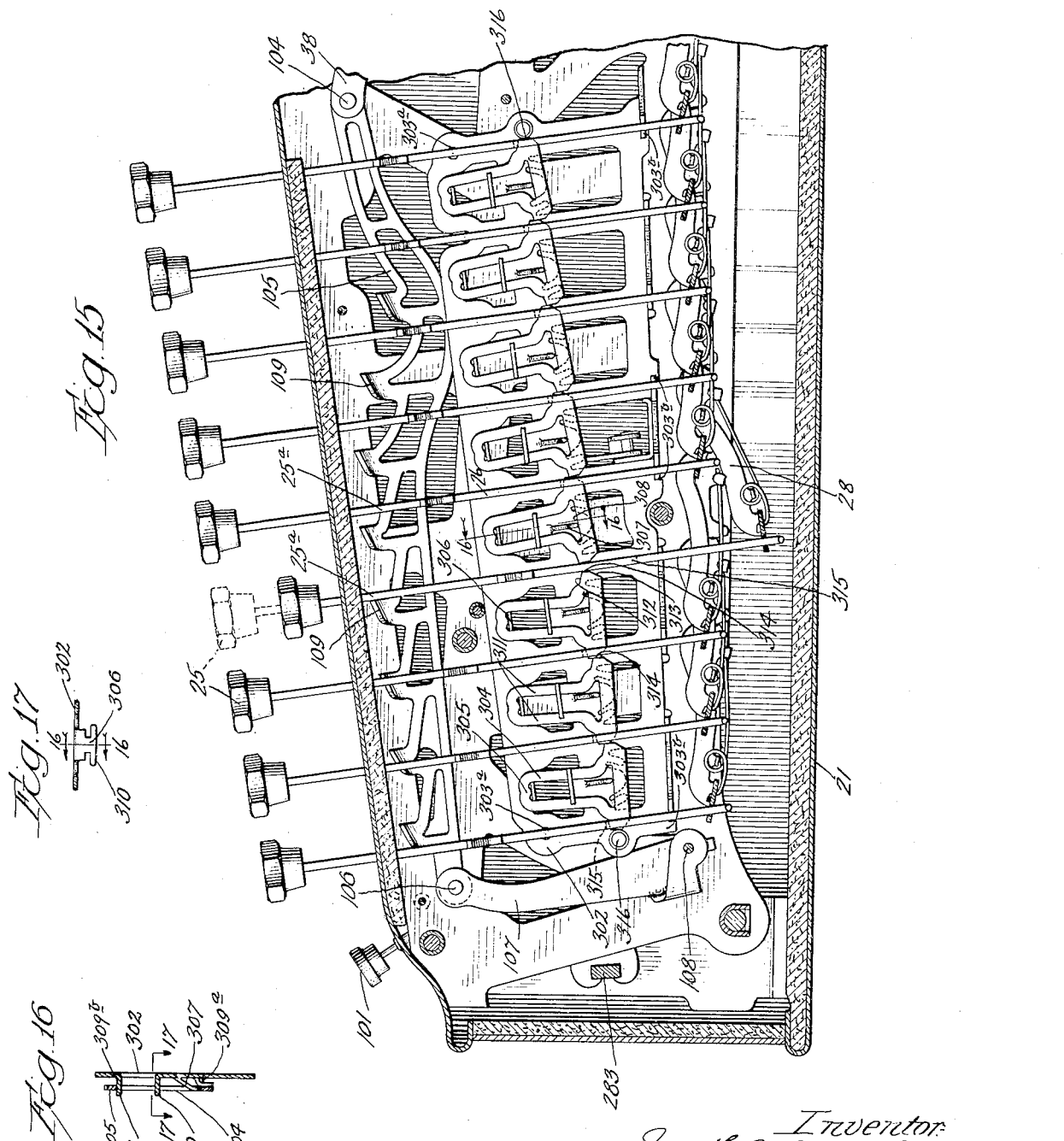

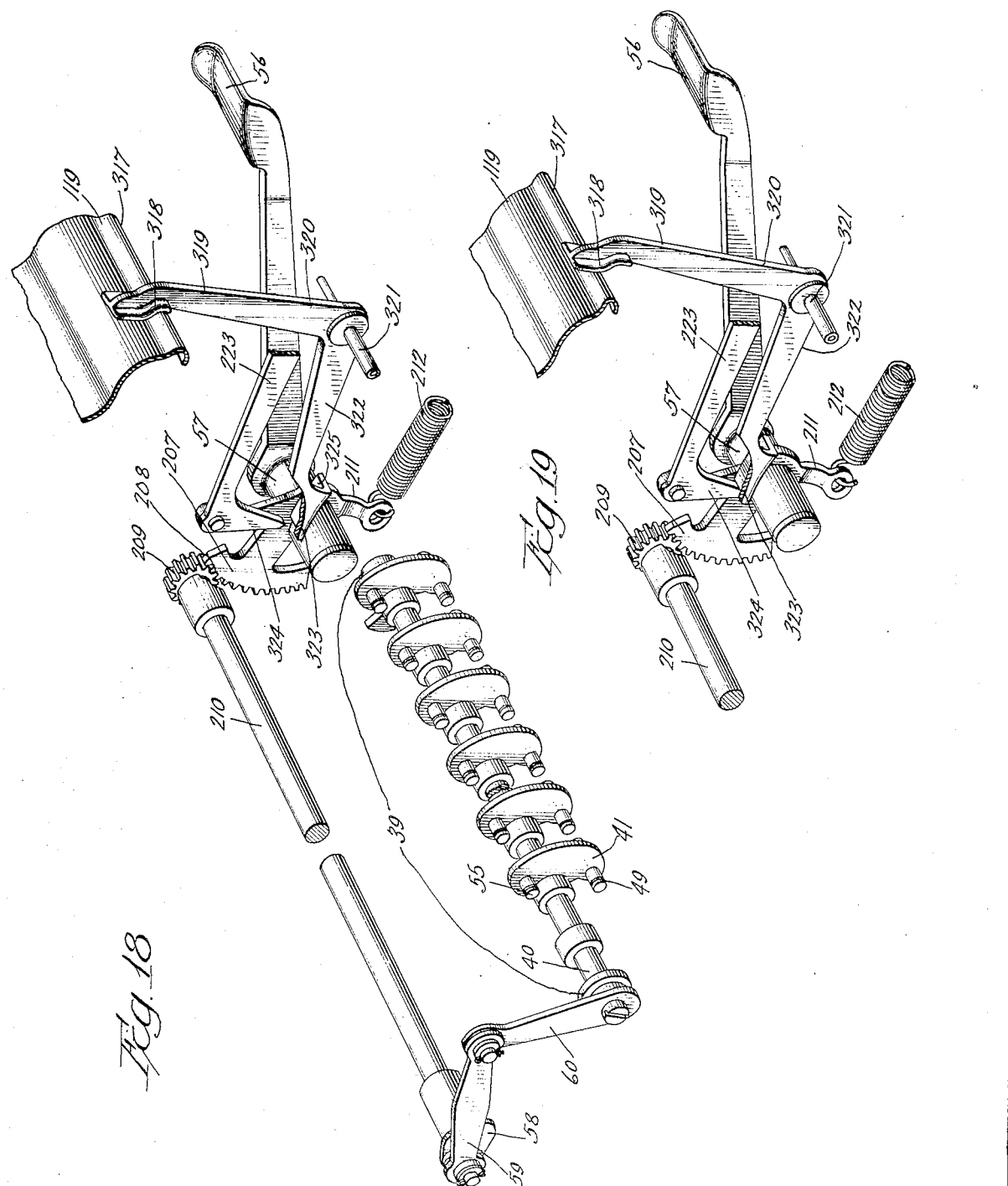

Sept. 12, 1933.   J. A. V. TURCK   1,926,826
CALCULATING MACHINE
Filed May 7, 1926   17 Sheets-Sheet 14
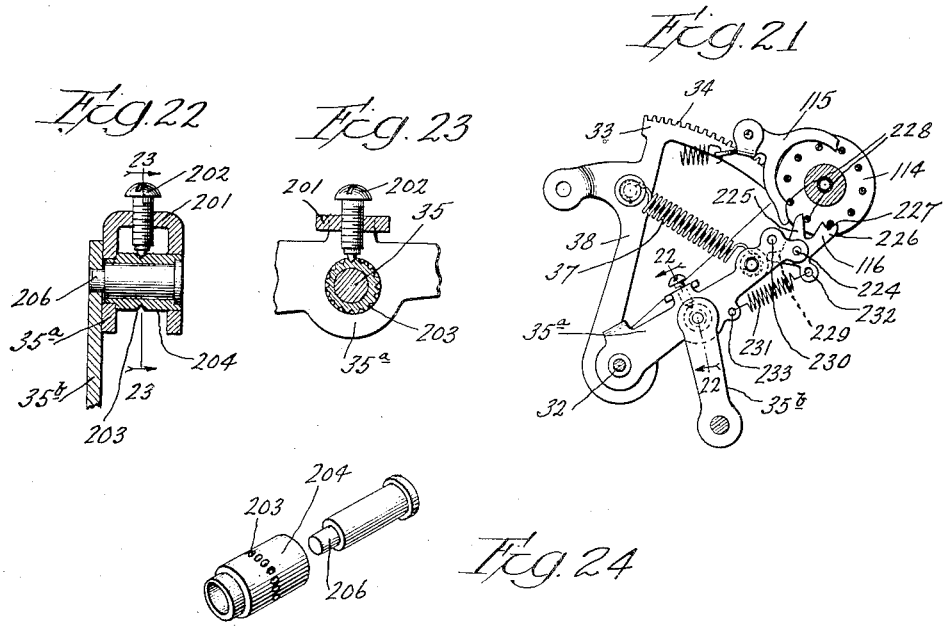
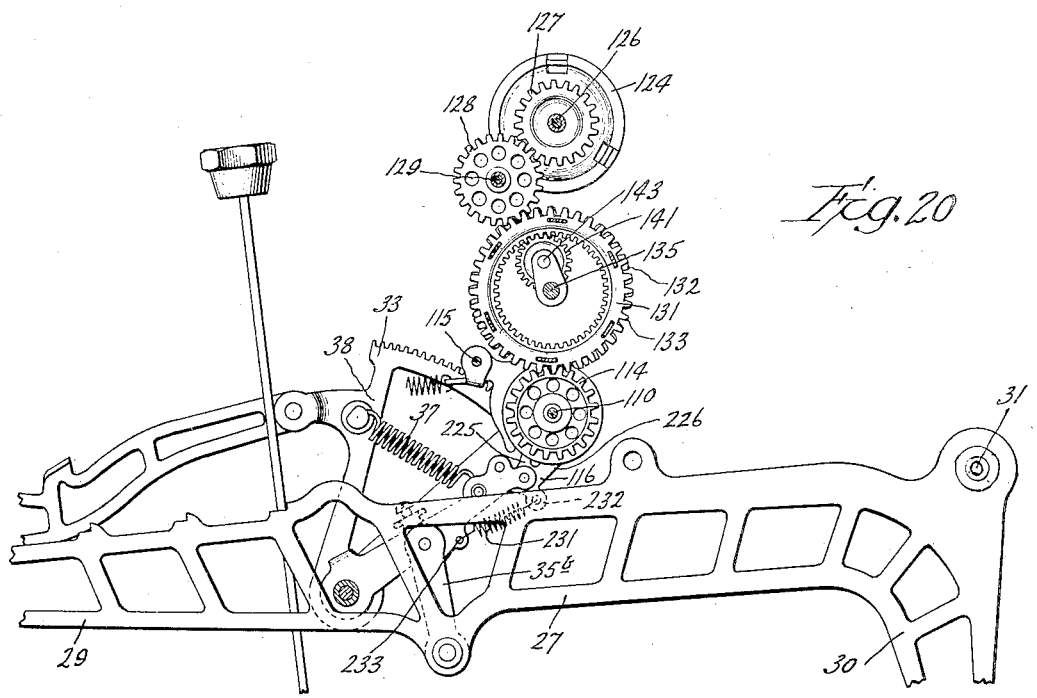
Inventor:
Joseph A. V. Turck
By: Munday Clarke & Carpenter Attys.

Sept. 12, 1933.  J. A. V. TURCK  1,926,826
CALCULATING MACHINE
Filed May 7, 1926  17 Sheets-Sheet 15
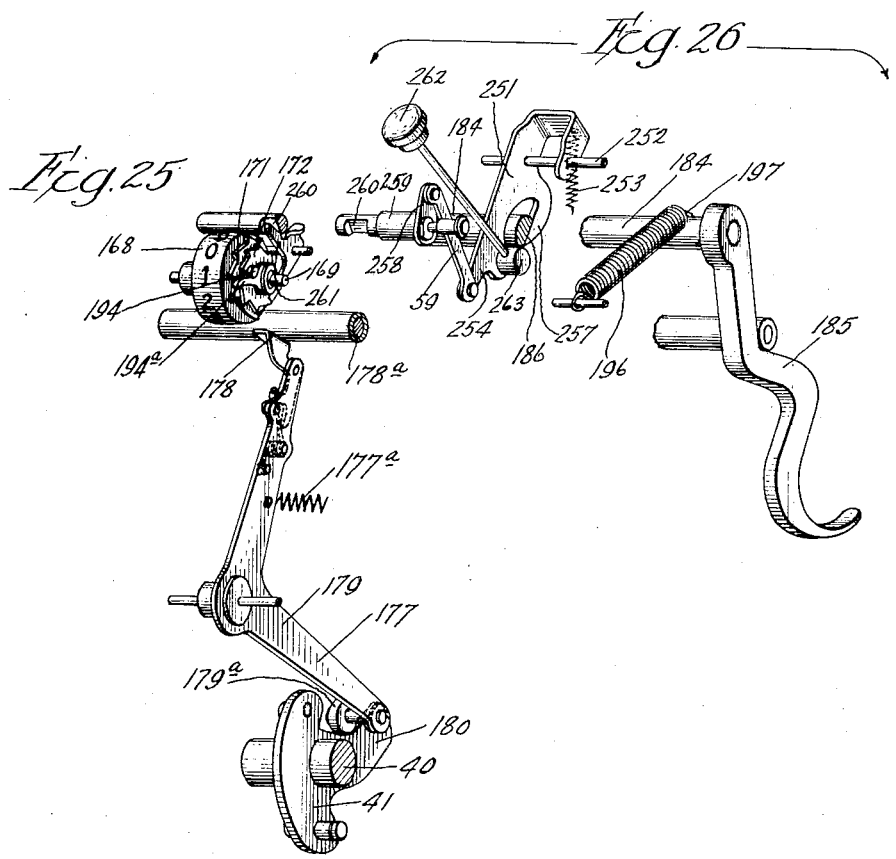
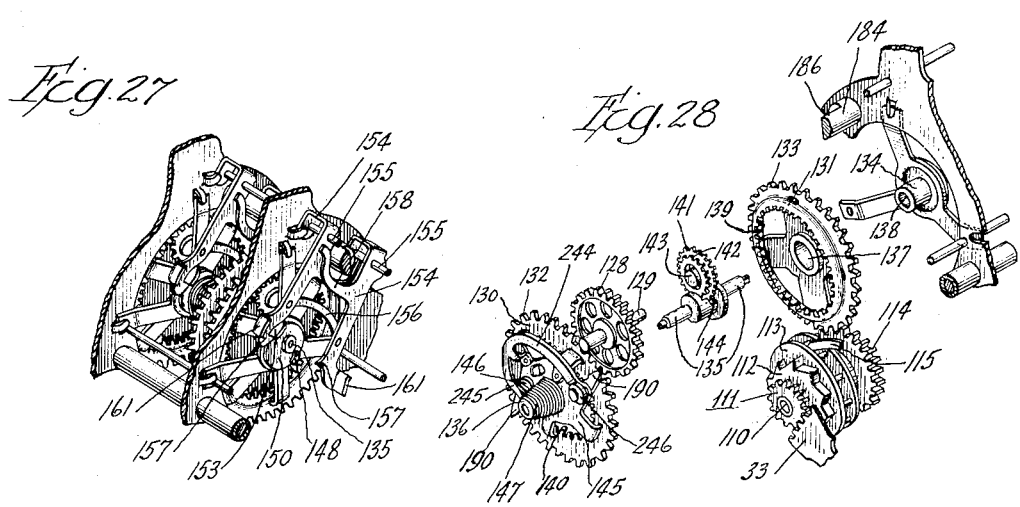

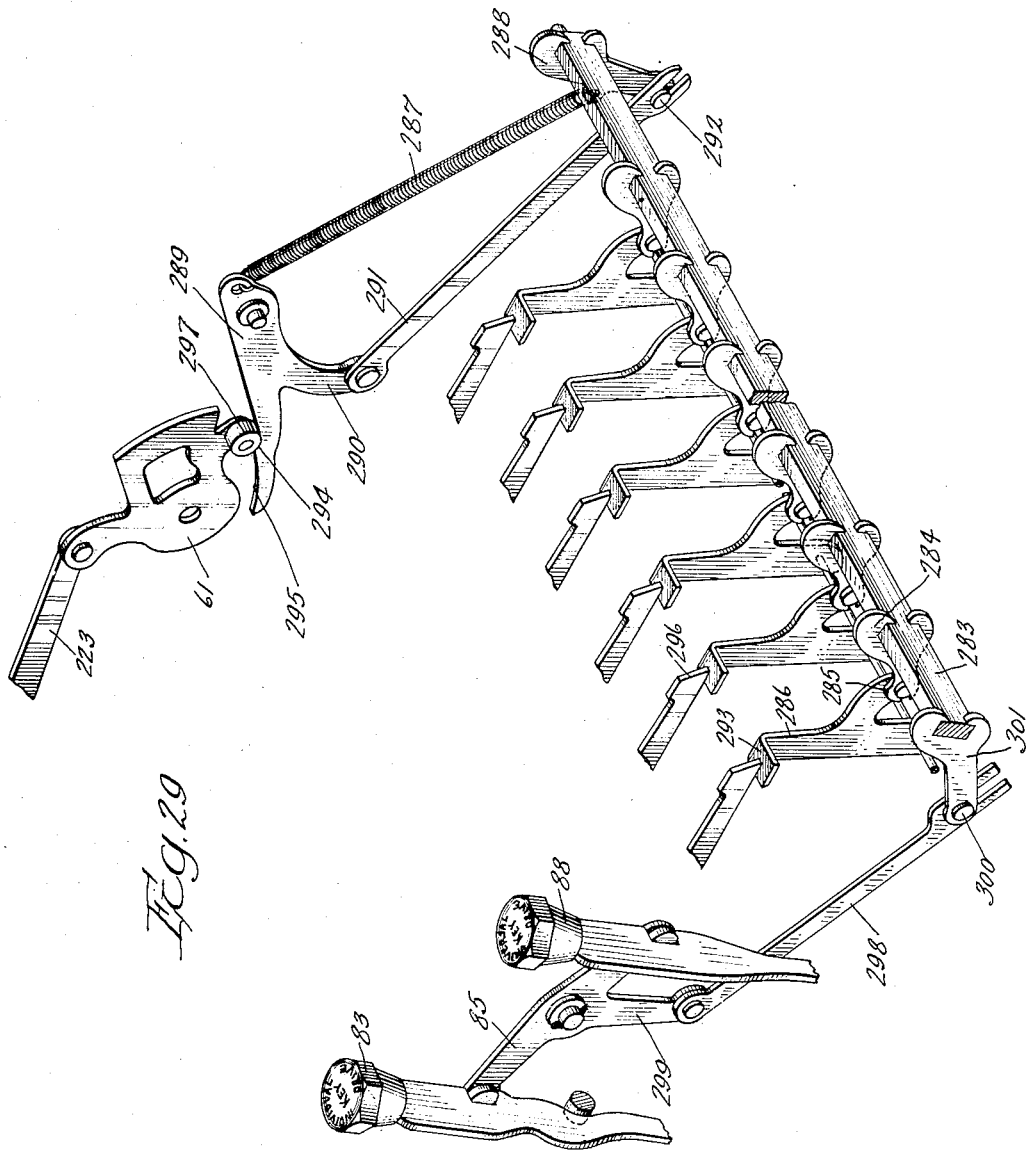

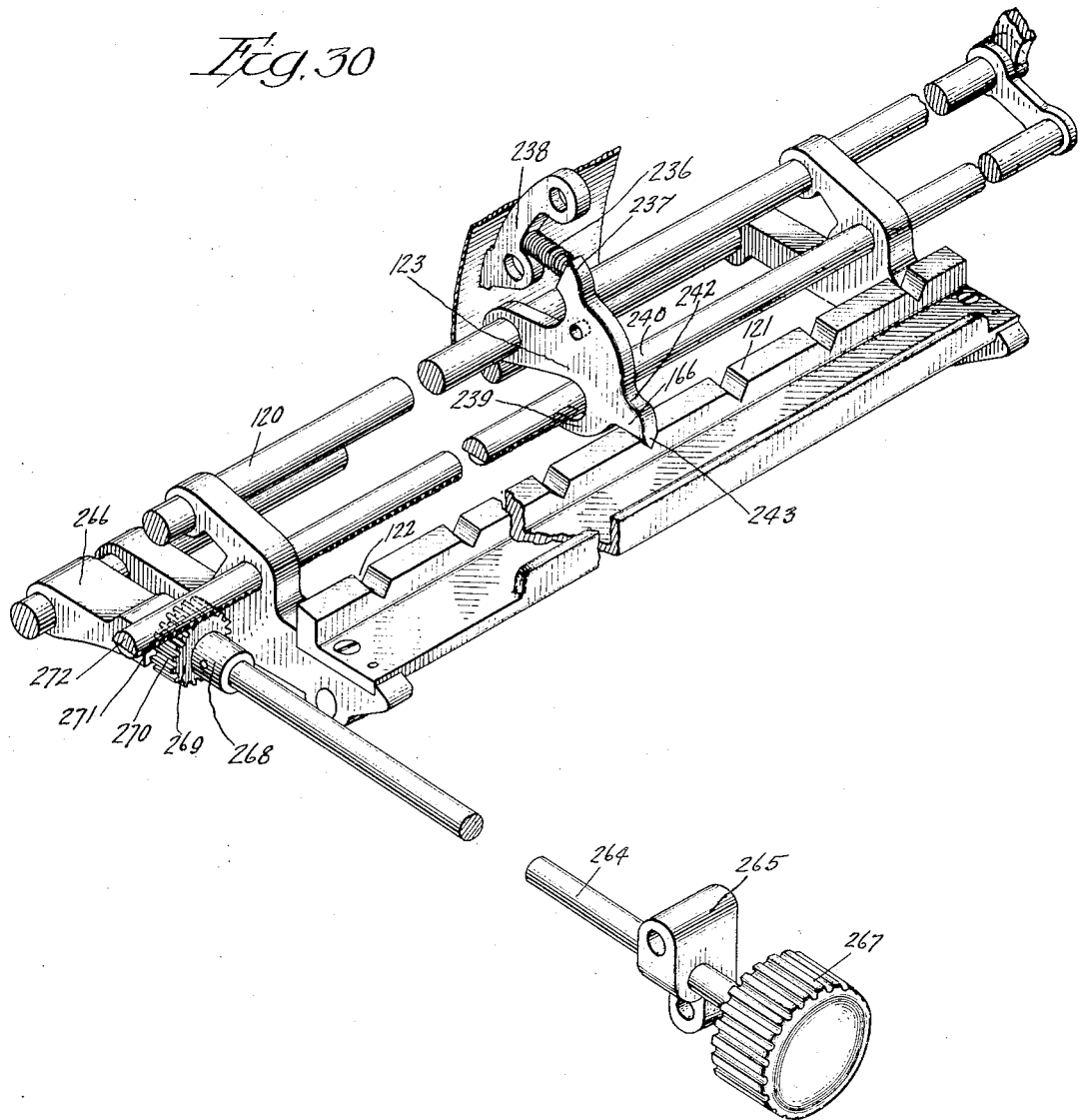

Patented Sept. 12, 1933

1,926,826

UNITED STATES PATENT OFFICE 1,926,826

CALCULATING MACHINE

Joseph A. V. Turck, Wilmette, Ill., assignor to Felt & Tarrant Manufacturing Company, Chicago, Ill., a corporation of Illinois Application May 7, 1926, Serial No. 107,527

48 Claims. (Cl. 235—82)

The essential object of this invention is to provide a calculating machine that is alternatively operable by individual key-drive, i. e., key by key, or by key-set universal-key drive, i. e., a single member operating many key set mechanisms, and including an accumulator mechanism of greater capacity than the key board, i. e., such as to register a product of many figures more than the number of mechanisms, said accumulator mechanism being alternatively either stationary or shiftable for key-driven actuation or else either stationary or shiftable for key-set universal-key actuation. With the machine of the present invention, the operator has the choice of either a key-drive or a key-set universal-key-drive when performing calculation, whether positively as in addition or multiplication, or negatively as in subtraction or division. In performing multiple stroke calculation, whether positively as in multiplication or negatively as in division, the operator may employ the individual key-drive with or without shift of the accumulator mechanism, or the universal-key-drive with shift of the accumulator mechanism for the accumulation of each order of multiple stroke factor.

Briefly stated, the machine of the present invention includes in its construction, among other novel features, the following features or any one or combination of them, as pointed out in the appended claims: ordinal column actuating mechanisms alternatively operable by ordinal key-drive or by key-set universal-key-drive; a manually controlled device for determining the character of drive of the column actuators; a universal-key operated mechanism for driving the column actuators in key-set universal-key-driven actuation; ordinal keys for driving the column actuators in individual key-driven actuation or for setting said actuators for universal-key-driven actuation; a carriage alternatively stationary or shiftable for individual-key-driven actuation or key-set universal-key-driven additive actuation, or for key-set universal-key-driven multiple-stroke actuation, said carriage supporting and shifting with it an ordinal accumulator mechanism, including means for effecting carrying of the tens, arranged to receive actuation from the column actuators in any ordinal position of the carriage, and also supporting a shiftable counter for registering the universal-key-driven actuations in each ordinal position of the carriage; zeroizing mechanism for restoring to zero the various orders of the accumulator mechanism and of the counter; the combination with universally driven ordinal actuating mechanism in which all resistance is relieved on the non-adding movement as in my co-pending application Serial No. 654,874, filed July 31, 1923, now Patent No. 1,869,872, granted August 2, 1932, of a universal-key actuated mechanism to cooperate with and actuate, by extremely lightened touch, said universally driven ordinal actuating mechanism; a dual flexible link action through which power is applied for additive operation in either individual key by key or universal-key drive; a new direct and indirect, or combined direct and indirect actuation of the numeral wheels of the registering mechanism; a digital control common to both individual-key and universal-key drive; a new ordinal column-actuator locking mechanism for the universal-key drive controlled selectively by a universal or by a columnar release; improved accumulator mechanism including a new escapement mechanism therefor; counter register zeroizing mechanism independently operable or universally operable with the zeroizing mechanism of the accumulative register; a mechanism for shifting the carriage one or more ordinal positions at a time, either to the right or to the left of the machine; a flexible carriage centering device to compensate and cushion variations of contact or strain when centering and shifting the carriage for cooperative ordinal relationship; a device for locking the universal-key-drive against universal movement when the carriage is raised out of accumulative registering relation; a lock for preventing operation of the universal-key drive when the machine is set for individual key drive, i. e., key by key; a key board non-adding lock for key-set action; a mechanism actuated by the universal-key drive to release the column actuators from the non-adding lock for key-set action when the universal-key-drive is operated; adjustable means between the actuating sector and column actuator-lever; a universal-key-drive, up-and-down stroke, as distinguished from universal crank drive with a rotary action or long pull stroke, and in which all the key-set column actuators are operable, when set for universal key-drive, by a mere light stroke key-action similar to the usual light stroke of the key board; an improved locking device for each of the column actuators, releasable only upon the setting of a key in an order, which prevents imparting incremental actuation in the unreleased or locked order or orders upon actuation of the universal key-drive; improved pallet back-stop and over-throw prevention stops for the actuator lantern wheels, designed to lessen friction and to function more definitely and certainly; locking mechanism for each ordinal column, to prevent depression of more than one key in a column until a prior operated key has completed functioning, such column lock operating both for the key setting in key-set universal-key-drive and for the key driving in individual-key drive; a subtraction key universal to varying number of orders of the accumulative mechanism that may be variably positioned in higher ordinal places than those of the key board.

In addition to the general objects recited above the invention has for further objects such other improvements or advantages in construction and operation as may be found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:—

Figure 2 is a right hand side elevation of the machine;

Figure 3 is a left hand side elevation of the machine;

Figure 4 is a view similar to Figure 1 but with part of the top casing plate and of the carriage and some of the keys broken away to show the interior construction;

Figure 5 is a vertical sectional view taken on the line 5—5 of Figure 1, showing portions of the universal-key-drive mechanism, non-adding stop mechanism for key-set action and interoperative carriage and universal-key lock;

Figure 6 is a vertical section taken on the line 6—6 of Figure 4, showing the carriage-shift mechanism and portions of the universal-key-drive mechanism, and showing the parts of the actuating mechanism in normal position;

Figure 7 is a vertical sectional view taken on the line 7—7 of Figure 4 and Figure 1, showing the operation of the actuating mechanism in individual-key-driven actuation of the machine;

Figure 8 is a vertical sectional view taken on the same line 7—7 of Figure 4 and Figure 1 as Figure 7 is taken, but showing the operation of the actuating mechanism in key-set universal-key-driven actuation of the machine;

Figure 9A:
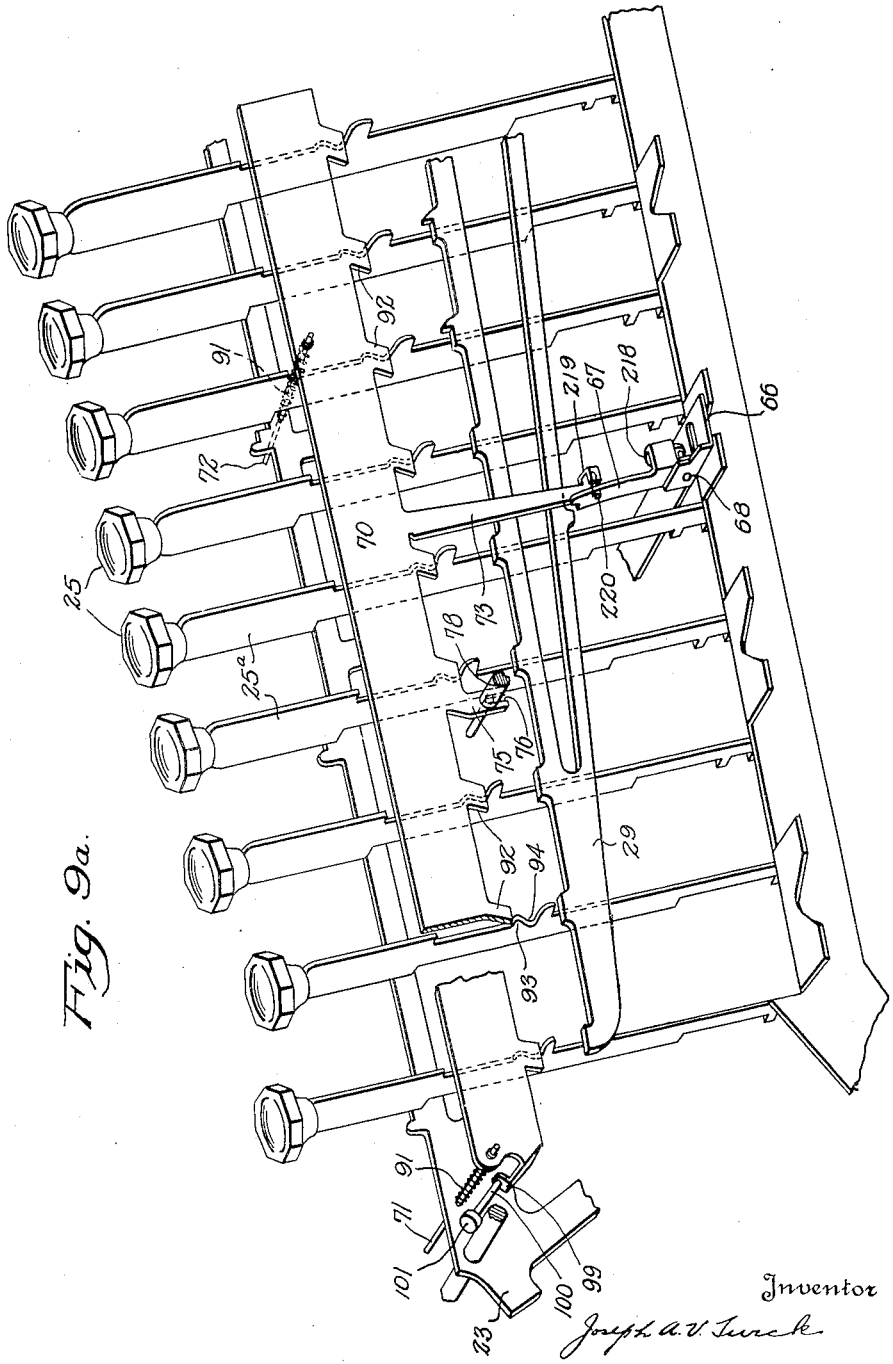
Figure 9 is a vertical transverse sectional view taken on the line 9—9 of Figure 8 and Figure 4, showing the column actuator locking mechanism and key-set locking mechanism which also acts to release the column-actuators of actuator locks.

Figure 9ª is a detailed perspective view of Fig. 9 showing nine keys and the cooperating parts thereof.

Figure 1:
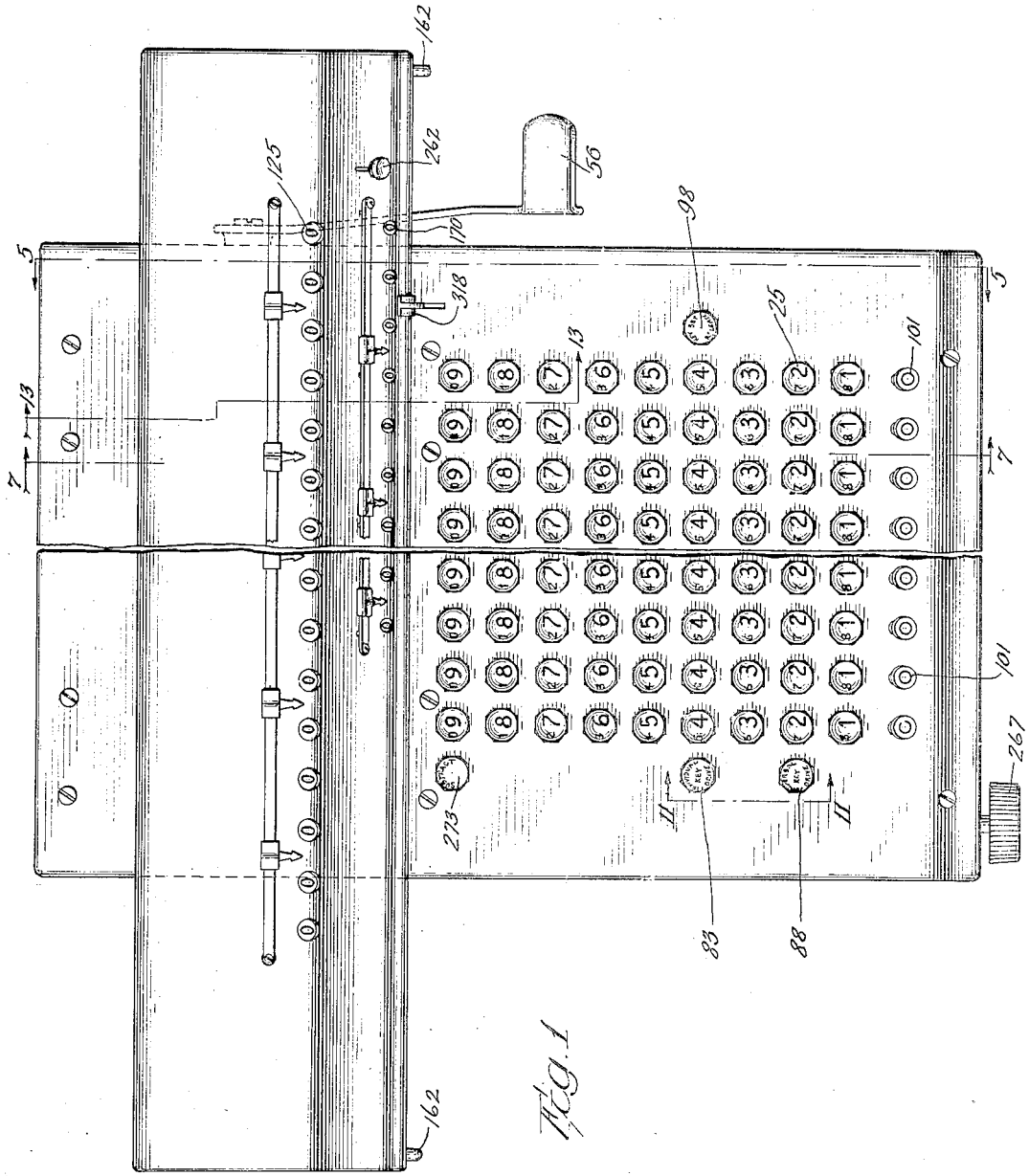
Figure 1 is a top plan view of a calculating machine constructed in accordance with the invention.
Figure 11:
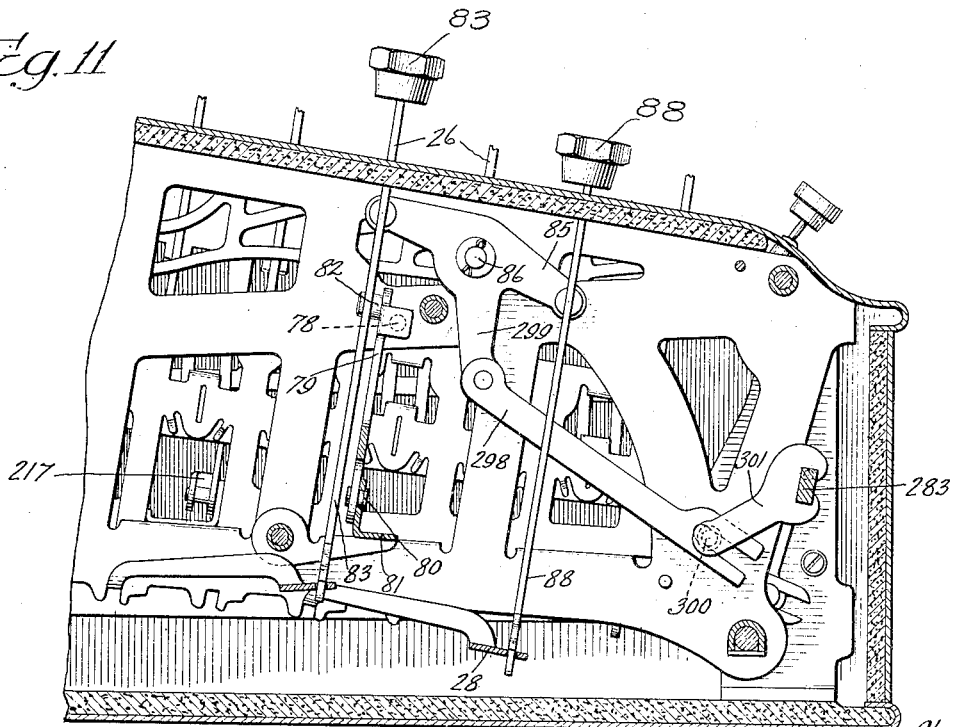
Figure 12:
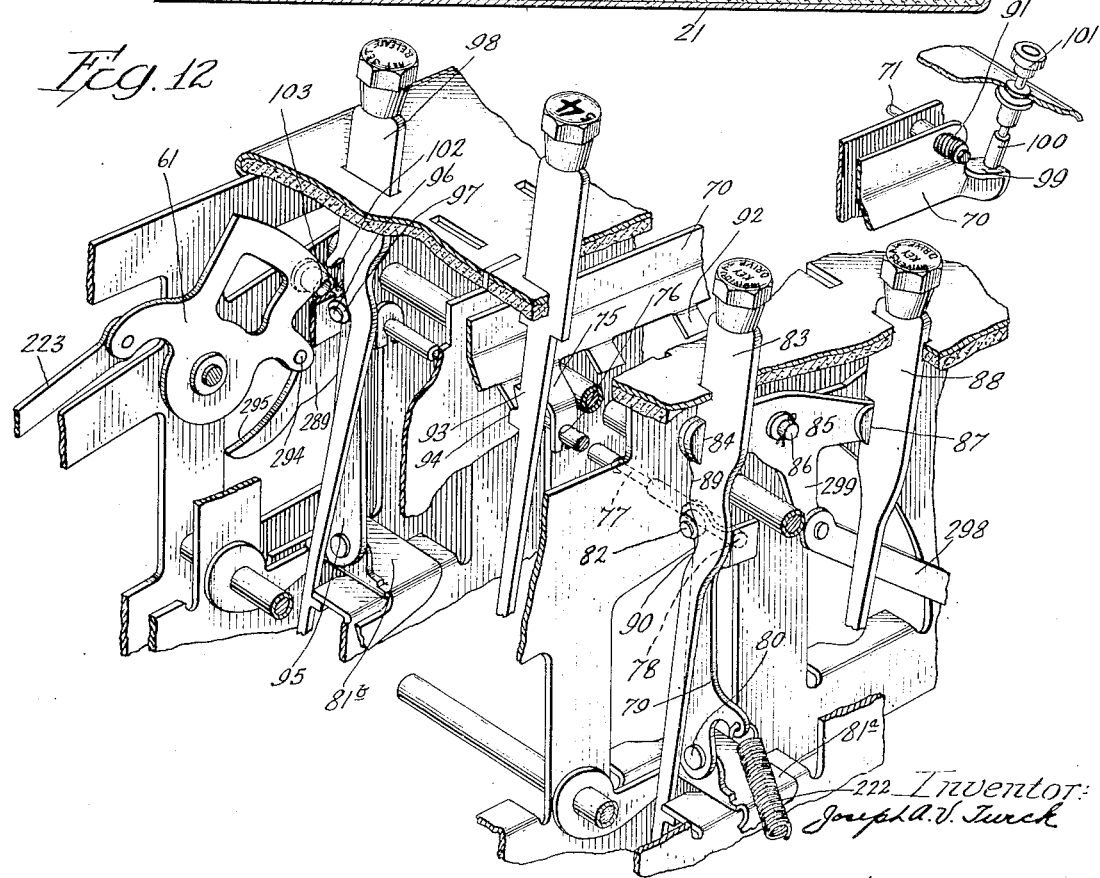
Figure 13:
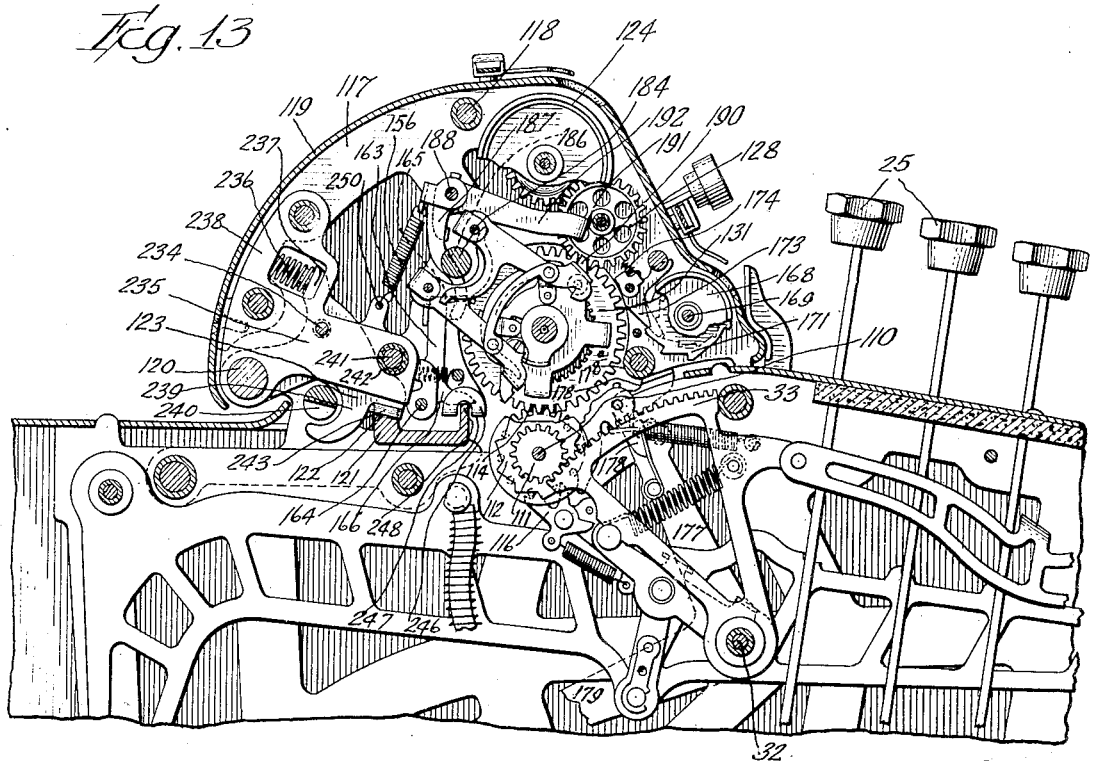
Figures 13A, 14:
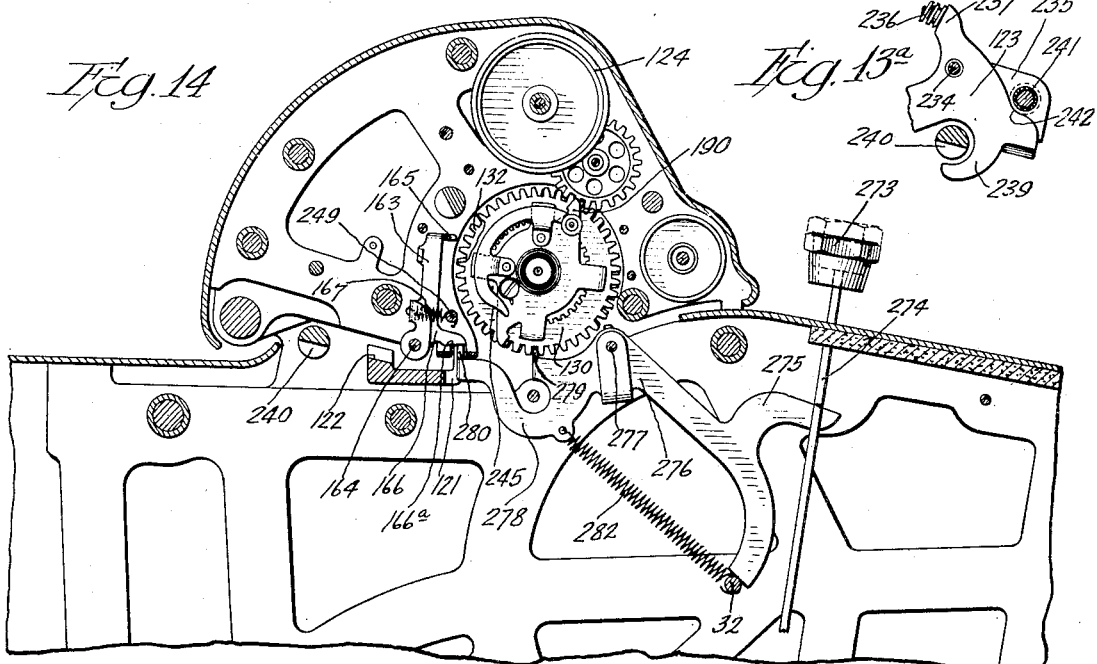

Figure 10 is a composite sectional view taken transversely of the machine and showing the accumulator mechanism, the counter mechanism and various other parts;

Figure 11 is a fragmentary, vertical, longitudinal, sectional view taken on the line 11—11 of Figure 1, showing non-adding lock as to key action under key-set operation, and also showing selective drive-setting device;

Figure 12 is a longitudinal, sectional view showing the selective drive-setting mechanism, the key-set action setting-device and the arrangement for locking the universal-key-drive against actuation operation while the machine is set for individual-key-driven actuation;

Figure 13 is a sectional view taken on the line 13—13 of Figure 1, through the rear of the machine showing a cross-section of the carriage;

Figure 13ª is a full line detailed view of the carriage centering-device lock arm;

Figure 14 is a sectional view taken through the rear of the machine showing the subtraction mechanism and subtraction-key universal to all orders of the accumulative mechanism greater than those of the key board;

Figure 15 is a vertical, sectional view of a portion of the machine, from front to rear, illustrating the column lock for individual-key-drive and for key-set universal-key-drive;

Figure 16 is a vertical, sectional view taken on the line 16—16 of Figure 15;

Figure 17 is a horizontal, sectional view taken on the line 17—17 of Figure 16;

Figure 18 is a perspective view illustrating the universal-key-drive and combined locking device for the carriage and for the universal-key;

Figure 19 is a perspective view illustrating the universal-key locked against actuating action while the carriage is in such raised position that the accumulator mechanism is disengaged from the column actuator mechanisms;

Figure 20 is an elevational view illustrating the actuating-stops, and the adjustment between the actuating-sector and column-actuator lever;

Figure 21 is a sectional, elevational view illustrating the arrangement of the pallet back-stop for the "controlled" wheel that transmits from the actuating sector to the drive gear and showing the actuating stop pivotally mounted on the actuating-sector, and showing the bushing adjustment between the actuating-sector and the actuating-lever;

Figure 22 is a vertical, sectional view taken on the line 22—22 of Figure 21, showing the eccentric bushing link adjustment;

Figure 23 is a vertical, sectional view taken on the line 23—23 of Figure 22;

Figure 24 is a perspective view of the eccentric bushing detached;

Figure 25 is a perspective view illustrating part of the counter driving-mechanism;

Figure 26 is a perspective view illustrating the right hand portion of the counter zeroizing mechanism;

Figure 27 is a perspective view illustrating the accumulator mechanism;

Figure 28 is a detached perspective view illustrating the accumulator mechanism in more detail;

Figure 29 is a perspective view illustrating the non-adding lock for key action under universal-key operation, and device for releasing the actuating-levers during action of the universal-key;

Figure 30 is a perspective view illustrating the flexible carriage-shift mechanism and the carriage centering device.

The various instrumentalities, which constitute the actuating mechanism from which calculative motion is transmitted to the accumulator mechanism, are supported by a frame mounted on a base 21 of an enclosing casing, said frame consisting of side skeleton plates 22 and intermediate skeleton plates 23 disposed between the various actuating mechanisms of the several orders of the machine, and all tied together at suitable points by transverse tie rods 24. The various orders of the actuating mechanism are "stationary", i. e., there is no shift from order to order of the actuating mechanism. In performing multiple-stroke key-set universal-key-driven calculation, shifting is effected by the carriage which supports the accumulator-mechanism, as hereinafter described.

According to the present type of machine, a number of columns of nine keys each are provided, a column for each order of the machine. Each column of keys 25 corresponds with the column actuator and attendant parts and constitutes a mechanism either for driving the column actuator an amount proportionate to the digital value of the particular key operated or for setting and controlling the column actuator to be otherwise driven a like amount. The keys of each column are numbered from "1" to "9" and complementally for negative calculation from "0" to "8" in front to rear order of the machine; the key at the extreme front is adapted to effect or otherwise to control operation of the column actuator through an arc substantially one-ninth of that produced by the operation of the key at the extreme rear of the machine, and upon depression of intermedially positioned keys, the column actuator is or may be moved through various arcs respectively determined by the digital value of the intermediate keys depressed.

Each key 25 is provided with a stem 26 extending down and bearing upon the corresponding column actuator 27 for key-driven actuation of the machine. Spring mechanisms 28 similar to those employed in the well known comptometer are utilized for the purpose of restoring the respective keys 25 to normal independently of the column actuator. The comptometer is exemplified in any one of the following prior Letters Patent of the United States: Dorr E. Felt, No. 762,520 and No. 762,521, dated June 29, 1904; Dorr E. Felt, No. 1,028,344, dated June 4, 1912; Dorr E. Felt, No. 1,066,096, dated July 1, 1913; Dorr E. Felt, No. 1,072,933, dated Sept. 9, 1913; Kurt F. Ziehm, No. 1,110,734, dated Sept. 15, 1914, Joseph A. V. Turck, Nos. 1,357,747 and 1,357,748, dated Nov. 2, 1920.

Features of the present invention are particularly adapted to calculating machines, and especially that type which is well known as the comptometer, the present illustrated embodiment of the invention is described in connection with and as an improvement upon the machine shown, described and claimed in the co-pending application of the present inventor, Joseph A. V. Turck, Serial No. 654,874, filed July 31, 1923, and entitled "Calculating machines".

There is a column actuator 27 for each column of nine keys of the machine, and each column actuator is preferably constructed in the form of a bell-crank lever having a long, horizontal arm 29, a relatively short depending vertical arm 30, and being pivoted at the junction point of said arms to the framework at the rear of the machine, as shown at 31. The horizontal arm 29 of the column actuator extends forwardly from rear to front of the machine and receives the key-impulse to actuate the accumulator, when the machine is set for key-driven actuation. Pivoted at 32 on a fixed shaft extending through and supported by the framework of the machine is an actuator sector 33 for transmitting the calculative motion of the column actuator to the accumulator. The pivoted sector 33 is provided with a set of gear teeth 34 on its arcuate periphery and said teeth are adapted to mesh with ordinal gears forming part of the ratchet mechanisms. Motion produced by the normal movement of the column actuator is transmitted to the pivoted sector 33 by an abutment 35 at the end of a double-arm lever 35a pivoted on the hub of the sector 33 concentrically with shaft 32 and connected with the column actuator by a link 35b. The two arms of the double-arm lever 35a are connected (see Figures 20-24) by a web 201 having a screw threaded aperture through which an adjustable screw 202 passes to engage in serrations 203 on a bushing 204 eccentrically mounted on said two arms, said bushing having its shaft 205 eccentrically mounted therein. A portion of said shaft extends outwardly at 206 from one of the arms 35a to pivotally connect the upper end of the link 35b with the double arm lever 35a. The provision of the eccentric bushing 201 and the screw 202 permits minute adjustment between the link 35b and the double-arm 35a so that said double-arm may be slightly raised or lowered with respect to said link 35b and the pivotal junction 206. The abutment 35 is normally held in engagement with the rear radial edge 36 of the sector by a spring 37 connecting the forward radial arm 38 of said sector with said abutment 35. So long as any key 25 is depressed only that amount necessary to effect a movement of the sector 33 correspondingly with the digital value of the key, the spring 37, during the downward movement of the column actuator arm 29, will hold the sector 33 against the abutment 35. If, however, the key be depressed beyond such normal movement the spring 37 will permit the abutment 35 to move, with a yielding action, away from the sector 33 as the column actuator arm 29 continues to move downwardly. This adjustable construction provides a flexible or cushioning action for the termination of the down-stroke of any key 25 during key-driven actuation, without in any manner affecting the definite motion required for correct calculative actuation of the accumulator. However, the tension of the spring may be sufficient to prevent any extended independent movement of the abutment 35 away from the sector, but without affecting the cushioning action. The cushioning action relieves any abrupt jar that may occur from the sudden stopping of the mechanism at the end of the key stroke.

In key-driven actuation, the column actuators are restored to normal, i. e., the horizontal arms 29 of said actuators are lifted, respectively by the key-arm-driven functioning member of the corresponding dual flexible link mechanism. This mechanism is a very important factor of the present machine. It provides power for restoring the column actuators to normal in key-driven actuation, relieves the column actuators from the stress of such power in key-set universal-key-driven actuation, and yet provides, during universal-key-driven actuation, a yielding connection between the column actuator and the universal actuator, permitting a constant movement of the universal actuator in all orders to take place coincidently with a variable movement of the column actuators, or no movement at all of said column actuators, as determined by the key-setting. It also forms a flexible connection for both depressing and restoring the column actuators to normal in universal-key-driven actuation. Further important features of the dual flexible link mechanism will be developed in the description of the key-set universal-key-driven operation of the machine.

The universal actuator 39 functions as an abutment for causing the spring-tensioning that effects the return movement of the column actuators in key-driven actuation. It comprises a universal-key-driven oscillatory shaft 40 extending transversely of the main frame. Fixed to said shaft 40 so as to partake of its oscillatory movement are the universal actuator plate members 41 which correspond ordinally with the column actuators 27. It is particularly these plate members 41 which constitute the abutments for the spring tensioning hereinafter referred to.

The dual flexible link mechanism of each column actuator and corresponding universal actuator plate comprises an upper link mechanism 42 and a lower link mechanism 43. The lower flexible link mechanisms 43 are arranged in pairs, as shown in Figure 4, but one may be employed for each column actuator: said mechanism provides the spring-tensioning which affords the power for the return of the column actuator in individual key driven actuation; during such actuation, any tension in the upper link mechanism is relieved in the tensioning of said lower mechanism, so that the upper mechanism remains perfectly neutral in individual key-driven actuation and affords no resistance to the column actuator movement. The parts which provide the flexible link action are shown in Figure 7, in the positions they assume, during individual key-driven actuation, at the end of a down stroke of a key. The said lower flexible link mechanism 43 includes a horizontally disposed coil spring 44 connected at its rear end to the stud 45 at the lower end of the vertical arm 30 of the column actuator. Within the spring 44 is a ram 46 having a head 47 which projects beyond the forward end of the spring 44. The forward end of the spring is secured to the head 47. In length the ram 46 is so proportioned relatively to the spring 44, that, when the rear end of the ram touches the abutment 45, the column actuator is relieved from such spring tension. As shown the head 47 is provided with a slot 48 extending parallel with the ram body 46 and the forward end of the ram is slidably attached to the lower end of the corresponding universal actuator plate 41 by a stud 49 secured to said plate, which projects transversely through said slot 48. The upper flexible link mechanism 42 of each order is constituted of parts similar to those of the lower mechanism 43 but is somewhat less in length. The spring 50 is secured at its upper end, at 51, to a stud located near the rear end of the horizontal column actuator arm 29, and said spring 50 inclines forwardly and downwardly toward the upper part of the universal actuator plate 41, being secured to the head 53 of the ram 52 which has a slidable connection with the plate 41 by the stud 55 which projects through the slot 54 in the ram head.

It will be noted that the upper and lower flexible link mechanisms 42 and 43 are respectively located on opposite sides of the pivotal axes 31 and 40 of the column actuator and of the universal actuator, and both said link mechanisms have slidable connections, as hereinbefore described, with the universal actuator. These features, taken in conjunction with the construction and arrangement of the parts themselves, cause the following operation to take place during individual key-driven actuation of the machine. In such actuation, the universal actuator including all the ordinal plates 41, is stationary, being in fact locked against movement by a device hereinafter described. When the parts are at normal, the studs 49 and 55 are respectively located at the forward and lower ends of the slots in the ram heads 47 and 53. Upon depression of a numeral key 25, the horizontal column actuator moves downwardly an amount proportional with the digital value of the key depressed. This movement of the column actuator turns the transmitting gear sector 33 in a counter-clockwise direction (see Figure 7) the required amount for the incremental accumulative actuation, which occurs on the reverse clockwise rotation of the sector 33. The downward movement of the horizontal column actuator arm 29 causes a rearward movement of the depending column actuator arm 30 and this rearward movement of said arm 30 stretches or tensions the spring 44 to produce power for the return movement of the column actuator, inasmuch as the ram 46 remains stationary. In this manner the spring 44 of the flexible link mechanism functions as the return spring for the column actuator in individual key-driven actuation. Although the spring action of the upper flexible link mechanism 42 is opposed to that of the lower flexible link mechanism 43, the spring 50 of said upper mechanism is not tensioned in either the downward or return movement of the column actuator and thus interposes no resistance to the movements of the parts in individual key-driven actuation. The entire upper flexible link mechanism 42 moves bodily downward with the horizontal arm 29 of the column actuator, as shown in Figure 7, the ram head 53 with its slot 54 sliding relatively to the stud 55 on the stationary universal actuator plate.

In all forms of calculative actuation, it is the upward return movement of the transmitting gear or adding sectors 33 that effects the actual transfer of incremental ordinal accumulation to the accumulator mechanism, namely, the adding actuation. This is effected by an ordinal internal ratchet mechanism, operating in like manner in the comptometer patents hereinbefore mentioned.

The operation of the actuating mechanism of the machine, when performing key-set universal-key-driven calculation is illustrated in Figure 8. In such key-set universal-key-driven actuation, the depression of any ordinal numeral key merely sets the digital control and unlocks the column actuator corresponding to its order for subsequent calculative movement by the universal-key-drive mechanism, the operation of a numeral key being merely an unlocking of an ordinal locking device corresponding to the order in which the key is depressed, as contra-distinguished from an actual calculative movement produced by key operation in individual numeral key-driven actuation of the machine. When the machine is set to operate in key-set universal-key-driven actuation, the column actuators in all orders of the machine are locked against movement by an ordinal locking mechanism and only those column actuators are operated which have been released by a setting of one of the corresponding ordinal keys. The oscillatory movement of the universal actuator plates 41 is employed first to depress and then to elevate those column actuators which have been released from the ordinal locking mechanism by previous key setting.

In the present embodiment of the invention, such oscillatory movement of the universal actuator is effected by the light touch of the universal-key 56 which operates the universal actuator mechanism, see Figures 1, 2, 4, 5, 6, 18, 19 and 29. The universal-key 56 is mounted on the outside of the right-hand vertical casing plate at the end of a stub-shaft 57 which it rotates. The stub-shaft extends transversely through the supporting frame of the machine and has a sector member 207 secured thereto, extending towards the rear of the machine, said sector having on its arcuate edge gear teeth 208 which are shown in Figure 18 in normal position ready to be operated to actuate the universal actuators, said teeth meshing with the teeth of a pinion 209 that is fast on a shaft 210 that extends transversely of the machine. The shaft 210 is provided at its left hand end, see Figure 18, with an oscillatory crank 58, that extends toward the rear of the machine and on which is pivoted, eccentrically to the axis of shaft 57, the rear end of link 59. The link 59 extends toward the front of the machine and is inclined upwardly, and is pivoted at its forward upper end to the upper end of an oscillatory lever 60, the upper end of the lever 60 being to the rear of the universal actuator shaft, and its other lower end being secured to the left hand end of the universal actuator shaft 40.

A member 211 extends downwardly from said sector 207 to engage one end of a spring 212 which is fastened at its other end to a stud 213 (Figures 5 and 6) fixed to the framework of the machine. The function of said spring is to restore the universal-key 56 to its elevated position and to return the sector 207, the shaft 210, the crank 58, and levers 59 and 60 to normal position in order to permit the dual flexible link mechanism to perform the upward oscillatory movement to effect the elevation of the key-set column actuators and sectors 33 so that said sectors 33 may upon their upward movement effect the actual transfer of incremental ordinal accumulation to the accumulator mechanism. The connections in the above described train are so proportioned relatively to each other that a mere light stroke depression of the universal-key 56 similar to that required of the numeral keys 25, will impart first a clockwise and next a counter-clockwise movement to the universal actuator shaft 40 (as in Figure 7) and the series of ordinal actuator plates 41. In other words, each single depression and elevation of the universal key is accompanied by a downward and upward oscillation of the universal actuator plates. In universal-key actuation, each single oscillation of said plates 41 effects a single incremental actuation movement of the selected column actuators.

The ordinal locking mechanism for preventing actuation of the column actuators by the universal actuator, in key-set universal-key-driven operation, is shown more particularly in Figures 9, 11 and 12. Extending transversely of and supported by the framework is a bar 66 which constitutes the support for the ordinal actuator locks 67. These locks are respectively pivotally mounted on a pin 68 on said bar 66 and their upper free ends are provided with locking notches 69 which are projected beneath the horizontal arms 29 of the column actuators to prevent depression thereof, whenever the locks 67 have been shifted pivotally toward the left of the machine, (towards the right as seen in Figure 9) by setting the machine for key-set universal-key-driven operation. A portion 214 of the base of the bar 66 is bent upwardly adjacent the vertical leg 215 of said bar, in such manner as to leave a guide space into which extends a projecting portion 216 of the lock 67, to maintain said lock in true position. A portion of each of said locks is bent in a direction towards the rear of the machine at 217 and said portion 217 is then rebent towards the left of the machine (towards the right Figure 9) to provide a pivotally supporting portion 218 mounted on the pin 68 thus providing a double bearing for the lock 67. Each ordinal lock 67 is controlled individually by its corresponding ordinal lock control bar 70. These bars 70 extend from front to rear in the various orders of the machine and are loosely supported by front and rear rods 71 and 72, which permit the bars to be swung individually or in unison on axes parallel with their length. Each bar 70 is provided with a depending arm 73 the lower end of which is folded U-shape, to provide a pocket, by bending a portion 219 integral with the rear edge of the arm towards the right of the machine, (towards the left Figure 9) and this portion 219 is again bent in the direction towards the front of the machine. This pocket incloses a pin 220 secured to the lock 67 near the upper end thereof. When the lower edges of the respective bars 70 are swung in unison towards the left of the machine, in a clockwise direction, (towards the right, in a counter-clockwise direction, viewing Figure 9) by the mechanism for setting the machine for key-set universal-key-driven operation, the several locks 67, through the connections 73, will be swung toward the left of the machine in a counter-clockwise direction, (toward the right in a clockwise direction as viewed in Figure 9), to move the locking notches 69 into engagement with the projection 221 of the column actuator arms 29. For this purpose each control bar 70 is provided with a depending arm 75 (see Figure 12) provided with a slot 76 that receives the grooved portion 77 of a shift rod 78 extending transversely of the framework. The shift rod 78 is engaged at its left-hand end by the upper end of a rocker arm 79. The lower end of said rocker arm is pivoted at 80 on a bracket 81a. Projecting rearwardly from the upper end of the rocker arm 79 is a roller 82 which forms the abutment for shifting the rocker arm 70 either toward the right or toward the left of the machine, in response to operation of the control key 83. The control key 83 is designated "individual key-drive" and is provided below the top casing plate with a notch 84 that loosely receives the rear end of a walking beam 85. The center of the walking beam 85 is pivoted at 86 to the side skeleton plate of the framework and the front end of said beam is loosely mounted within a similar notch 87 in the "universal-key-drive" control key 88. The notches 84 and 87 are so located in the respective control keys 83 and 88 that the walking beam 85 will elevate one key as the other is depressed. The "individual key-drive" control key 83 is provided with an upper notch 89 and a lower notch 90 so located that when the "universal-key-drive" control key 88 is depressed the notch 90 is in engagement with the roller 82 on the upper end of the rocker arm 79, and when the "individual-key-drive" control key 83 is depressed the upper notch 89 is in engagement with the roller 82. As shown in Figure 12, the upper notch 89 is located further toward the right of the machine than the lower notch 90. When the universal-key-drive control key is depressed and the individual key-drive control key is concurrently elevated, the positioning of the notch 90 in registering with the roller 82 permits the several control bars 70 to move toward the left side of the machine (that is, to the right of Figs. 9 and 12) to shift the several ordinal locks 67 into locking positions. This movement of the control bars 70 is accomplished by springs 91 encircling the supporting rods 71 and 72 in the various orders of the machine between each control bar and the corresponding ordinal skeleton plate and bearing on the control bars in such manner as to push their depending arms 73 toward the left of the machine, i. e., toward the right-hand side of Figure 9, to effect the movement of the several ordinal locks 67 into column actuator locking positions. On the other hand when the "individual key-drive" key 83 is depressed the upper notch 89 is brought into registry with the roller 82, and such movement of the key 83 causes the rocker arm 79 to move toward the right of the machine, with the result that the rod 78 is likewise moved to the right. This movement of the rod 78 is transmitted to the several control bars 70 in unison through the arms 75, thereby shifting all the connecting arms 73 in unison toward the right of the machine (i. e., toward the left-hand of Figure 9) to shift all of the ordinal locks 67 out of their locking positions. The last described operation effected by depression of the key 83 sets the machine for individual-key-driven actuation, whereas the depression of the key 88 sets the machine for universal-key-driven actuation.

A spring 222 is secured at one end to the lower portion of the rocker arm 79 and its other end is secured to the framework of the machine. The function of said spring is to tend to pull such rocker arms 79 toward and its roller 82 against the universal-key-drive control key 83 so as to reduce the pressure required of the springs 91 in shifting the rod 78 to key-set position.

As hereinbefore stated, when the machine is set for key-set universal-key-driven actuation, the depression of an ordinal numeral key 25 unlocks the ordinal lock 67 of the corresponding orders. For this purpose each control bar 70 is provided with a series constituted of nine depending projections 92 which respectively correspond to the column of nine numeral keys 25 of the corresponding order of the machine. Each numeral key 25 is provided with a projection 93 located on the right-hand-side of its stem 26 and having a notch 94 which receives the corresponding projection 92 of the ordinal lock control bar when the key is in normal position. On depression of key for key-set actuation the shoulder above the notch 94 engages the control bar projection 92, so that the downward movement of the key causes the lower edge of the control bar to move toward the right of the machine with the result that the depending connection 73 is also shifted toward the right side of the machine (toward the left of Fig. 9) to throw the ordinal lock 67 of the order corresponding with the key to inoperative position, thereby permitting the universal actuator to effect a calculative movement of the column actuator of that order. As the key 25 moves downwardly the shoulder above the notch 94 is positioned beneath the projection 92, as shown in Figure 9, thereby holding the key depressed in key-set position until released either by the "key-set release" mechanism or as hereinafter described. After the keys of the various selected orders have been "set" as above described the universal actuator mechanism may be operated either for a single actuation, as in addition calculation, or for as many repeated actuations as desired, when performing multiple stroke calculation.

When the desired calculative actuation has been completed, whether single or multiple stroke, the several selected numeral keys 25, which have been set are restored to normal positions and the released column actuator locks of their respective orders are repositioned for locking the column actuators. This is accomplished by the universal-lock release mechanism or by changing to individual key-drive and then rechanging back to key-set universal-key-drive. Pivotally mounted on a bracket 81b at the right-hand side of the machine is a rocker arm 95 the upper end of which is slotted to receive one of the grooves of the column actuator lock shift rod 78. A roller 96 projects rearwardly from said rocker arm 95 and normally enters a notch 97 in the "key-set release" key 98, with the result that the parts remain in normal, or key-set positions. When the key 98 is depressed, its portion above the notch 97 forces the roller 96 and the upper end of the rocker arm 95 toward the right of the machine, so that the shift rod 78 is likewise moved toward the right, thereby through the arms 75, shifting the depending arms 73 toward the right side of the machine (toward the left of Fig. 9) to move all the locks 67 to their extreme releasing positions and the projection 92 away from the normal keys which they have been holding down so that any set numeral keys are permitted to rise under the actions of their springs to normal positions. When the "key-set release" key 98 is released its spring return mechanism, corresponding to the spring return mechanism 28 of the numeral key, will restore it to normal position to reengage the notch 97 with the roller 96. This permits the springs 91 to throw all of the control bars 70 and their corresponding column actuator locks 67 back to locking positions. If desired, however, a resetting may be effected in any column, or where a cipher is desired, by operating a columnar release as hereinafter explained.

There is also provided a columnar release mechanism employed for the individual column actuator locks 67, for example when it is desired to release either the column actuator lock of any selected column or to move the control bar 70 to its extreme releasing position, to release a numeral key 25 which has been previously "set" in that column. This columnar release mechanism may be employed for correcting an error in the key setting of any column, and permits a new key setting to be made in any column, if a key has been previously set in that column without making it necessary to release the key setting in other columns, as would happen in an operation of the "key set release" key 98. Referring especially to Figure 12, each control bar 70 is provided at its extreme front end with a horizontal shoulder 99 on which rests the lower end of the key stem 100 of the small columnar release or "cipher" key 101. When said key 101 is depressed, the shoulder 99 is moved downwardly causing a leverage action to force the lower edge of the lock bar 70 toward the right of the machine, to release a numeral key 25 the shoulder of which is retained beneath a projection 92 of said control bar. Inasmuch as there are release keys 101 for each column, the setting of any individual column is subject to individual control and to resetting in any manner desired by the operator. When the finger is removed from a depressed key 101 the parts will be restored to normal position by the springs 91 corresponding to the control bar 70 which has been shifted by said key 101 to releasing position.

The setting of the machine for universal-key-driven actuation unlocks the universal-key 56 for the operation of the universal actuator. When the "universal-key drive" key 88 is depressed, the movement of the shift rod 78 toward the left of the machine withdraws the right-hand end 102 of said rod from locking position in a hole or socket 103 arranged in the path of disk 61 which is operatively connected by rod 223 with sector 207 of the universal-key 56, thus freeing the sector 207 and universal-key 56 for movement. This construction also prevents setting of the machine from universal-key-driven to individual key-driven actuation, except when the universal-key 56 and disk 61 are in their normal positions, since the movement of the disk 61 away from normal always brings the disk 61 into the path of the shift bar 78 covering the hole or socket 103 and the shift bar cannot be operated by the "individual-key-drive" key 83, to release the column locks for individual-key-driven operation of the actuating mechanism, or by the key-set release key 98. When the disk 61 is in normal position, the universal-key 56, shaft 57, sector 207, and associated parts will be locked against operation by the setting of the machine for individual key-drive, since the end 102 of the shift bar enters the socket 103 and is in the path of the disk 61 to prevent oscillation of the disk 61.

The operation of the universal actuator, in key-set universal-key-driven actuation of the machine, is shown in Figure 8. As hereinbefore stated, each complete depression of the universal-key 56 produces first a clockwise movement and next a counter-clockwise movement of the shaft 40 and ordinal universal actuator plates 41. Those column actuators which have not been set for universal-key-driven operations are locked against movement by their corresponding column locks 67, but in the various orders in which key-setting has taken place, the respective column actuator arms 29 may move variably downwardly, in accordance with the digital value of their respective key-settings, until their motion is arrested by the digital control device hereinafter explained. The dual flexible link mechanism connecting the universal actuator plates with the column actuators in the several orders, permits the constant oscillatory motion of the plates 41 in all orders, although column actuators have been set for relatively variable movements and in some orders, as required by the example to be performed, no setting of the column actuators may have taken place at all. Moreover, this operation is accomplished by the invention with a minimum resistance to the movement of the universal-key 56. In fact, the resistance to universal-key-drive movement is inversely proportional to the digital value of the key-setting in the various orders and to the number of orders set for operation, so that the greater the digital value of the factor set-up on the key-board, the less becomes the resistance. This is accomplished by releasing from all tension the springs 44 of the lower dual flexible link mechanisms, so that no resistance is imparted by said springs 44 to either the downward or the upward movement of the column actuator studs 49, and by releasing from tension the springs 50 of the upper flexible link mechanisms 42 so long as the corresponding column actuators are moving with the universal actuator plates 41 in either direction. This operation is as follows: On the clockwise movement of a universal actuator plate 41, the upper flexible link mechanism 42 pulls down with said plate 41 in the horizontal arm 29 of the corresponding column actuator, if said actuator has been previously set by the depression of a numeral key 25. There is no stretching or tensioning of the spring 50 so long as the arm 29 is moving downwardly, and, inasmuch as the stud 49 is traveling in the slot 48 of the ram of the lower flexible link mechanism 43, there is likewise no stretching or tensioning of the spring 44. When, however, the downward movement of the column actuator arm 29 has been completed to effect the required incremental accumulation and said column actuator arm has been arrested by the digital stop device, the spring 50 will be stretched or tensioned proportionally with the remainder of the clockwise stroke of the universal actuator plate 41. During the counter-clockwise return stroke of the universal actuator plate 41, the stud 49 travels freely in reverse direction in the slotted head of the ram 43 without tensioning the spring 44, and the pull on the spring 50 of the upper flexible link mechanism being released, the spring 50 retracts to lift up its ram 52 and also to restore the horizontal column actuator arm 29 to its normal elevated position. Inasmuch as there is no resistance to the downward movement of the column actuators, during the oscillatory motion of plates 41, the springs 50 have merely a minimum load to carry in depressing column actuators and thus the tension derived from such actuators as are locked against depression is reduced to a minimum. If there has been no key-setting of a column actuator in any order of the machine, the horizontal arm 29 is held against movement by its corresponding column lock 67, and the tensioning of the spring 50 of the corresponding flexible link mechanism will commence at the beginning of the clockwise stroke of the universal actuator plate 41, and the return movement of said plate 41 allows the tension of spring 44 to pull back its column actuator and the ram 52 into normal elevated position.

The digital stop or control device operates to insure accuracy of movement of the column actuators in transferring their incremental accumulations to the accumulator mechanism, whether the machine be operating in individual-key-driven actuation or in key-set universal-key-driven actuation. Pivotally mounted at 104 on the forward arm 38 of the adding sector of each column actuator is a digital stop bar 105 which extends to the front of the machine and has its front end pivoted at 106 to the top of a rocker arm 107, the latter being pivoted on a cross-rod 108. The said bar 105 is provided with a series of eight stops or projections 109 respectively corresponding to the column of digital or numeral keys of its corresponding order, with the exception of the nine key 25 and adapted to arrest the rearward movement of said bar 105 by the depression or setting of a key 25, (see Figures 4, 7, 8, 9 and 15). The nine key and the movement of the sector 33 corresponding thereto represents the extreme movement of said sector, and such movement is preferably arrested by a fixed stop 109a attached to the framework, although, if desired, a further stop 109 for the nine key could be provided on the stop bar. The stops or projections 109 are located at different distances in front of the keys with which they respectively co-operate, the stop 109 corresponding to the "1" key being the nearest to said key and the stop corresponding to the "9" key being the farthest away. When a key 25 is actuated in individual-key-driven actuation or set for universal-key-driven actuation, the adding sector 33 of the corresponding column may move downwardly until the bar 105 has shifted the corresponding stop into engagement with the key depressed, whereupon the movement of the sector 33 is arrested, and the column actuator will either make a cushioned stroke, as heretofore explained, during key-driven actuation or will stop moving permitting stretching of the corresponding flexible link mechanism spring 50.

In individual-key-driven actuation, the keys 25 have a relatively long motion, as hereinbefore explained, in accordance with their digital values, but in key-set actuation the several keys 25 of each order have a relatively short movement, both downwardly and upwardly, notwithstanding their digital values. The digital-control mechanism of the invention adapts the same series of stop lugs 109 on bar 105 to either the movement of the keys in individual-key-drive or the limited movement of the keys in universal-key-drive, by reason of the following arrangement of the stops 109 on bar 105 with respect to the stop shoulders 25a on the cooperating keys. Inasmuch as the bar 105 moves progressively increasing distances rearwardly as determined by the value of the digital key operated, whether in universal-key-drive or individual key-drive, it is necessary that the stop 109 on bar 105 be differentially spaced from the respective keys with which they co-operate. But this arrangement brings, for example, the stop corresponding to the "6" key under the shoulder 25a of the "5" key, the stop corresponding to the "7" key under the shoulder of the "6" key, and the stop corresponding to the "8" key forwardly of the shoulder 25a of the "7" key. Consequently, it is necessary to lower the stops comparatively and also the shoulders 25a just mentioned, so that the stops may be moved to their proper keys, under universal-key-drive, without interference by a stop of a higher-value key. Thus, if the "6" stop of the bar 105 is to be lowered to accommodate the setting of the "5" key, the number "7" stop of the bar must be still lower to accommodate the number "6" key setting, so on for the number "8" stop for the number "7" key, and, if a number "9" stop be provided, the "9" stop for the "8" key. The stops must also be lowered for increasing distance in the progressive order mentioned to accommodate the alternative individual-key-drive as well as the universal-key-drive, and the lowering of the stops 109 and the shoulders 25a on the keys must be properly proportioned to both drives.

The motion of the adding sectors 33 of the column actuators is transmitted to the accumulator mechanism by ordinal internal ratchet mechanisms, which operate on the same principle as the internal ratchet mechanisms of the standard "comptometer" type exemplified in the prior patents hereinbefore mentioned, for permitting the numeral wheel and transmitting gearing of the accumulator mechanism to remain idle during the rearward downstroke of the corresponding adding sector 33, but to be actuated to effect the accumulation during the return stroke of said sector. These ordinal ratchet mechanisms are mounted on a supporting rod or shaft 110 that extends transversely through the stationary framework of the machine. Each ratchet mechanism includes a gear 111 in mesh with the rack teeth of the corresponding ordinal sector 33, an internal ratchet 112 fixed to said gear 111, a lantern wheel 113, a gear 114, fixed to said lantern wheel and adapted to mesh with an order of the accumulator mechanism, (see Figures 6, 8, 13, 20, 27 and 28) and the usual internal pawl (not shown) interposed between the internal ratchet and the lantern wheel for clutching the lantern wheel and gear 114 to the ratchet 112 only during the return up-stroke of the corresponding adding sector. Co-operating with the lantern wheel are the usual stop devices for preventing erroneous operation, said devices including the spring actuated double armed backstops providing two pawls 115 that function as a double escapement or pallet motion mechanism, and the spring actuated actuating-stop over-throw-prevention pawl member 116.

The actuating stop 116 is pivotally mounted at 224 on the upper rear end of the arm 35a (see Fig. 21), and is provided with two arms 225 and 226, the last mentioned arm 226 being notched at 227, so that upon completion of the upward movement of the sector 33, the arm 225 first enters the space between two of the pins 228 of the lantern wheel, which rotates in a clockwise direction viewing Figure 21, and as arm 225 is engaged by a pin 228 it slightly pulls the arm 226 into position if a sudden shock of key-operation tends to flirt the lantern wheel ahead of the driving action of the ratchet, so that the next pin 228 (towards the right) engages in the notch 227, stopping the lantern wheel even though the actuating sector has not fully returned. The actuating stop 116 has an arm 229 that engages a pin 230 on the arm 35a to limit the movement of the actuating stop 116 (toward the right Figure 21), and a spring 231 engages the member 116 at 232 and has its other end fastened to the arm 35a at 233, said spring tending to pull the member 116 towards the right (Figure 21) for the purpose of holding the arms 225 and 226 in engagement with the pins 228 of the lantern wheel and also to permit the member 116 to move slightly towards the left (Figure 21), at the start of the downstroke of the sectors 33, to permit the arms 225 and 226 to be disengaged from the pins 228. Such construction provides more certain and definite engagement of the actuating stops 116 with the lantern wheel at the time when the lantern wheel has rotated an amount proportional with the incremental actuation intended, but normally would not function, being provided only to prevent error from shock operation.

In accordance with the invention, the accumulator mechanism is optionally either stationary with respect to the several orders of the actuating mechanism (both for individual key-driven actuation or for key-set universal-key-driven actuation) or shiftable both for key-set universal-key-driven multiple stroke actuation or for individual-key-driven multiple stroke actuation. The accumulator mechanism includes the numeral wheels, and the interposed transmission gearing mechanism which receives direct incremental actuation from the column actuators and transfers it to the numeral wheels of the corresponding orders and also receives or transmits indirect actuation from a lower order gearing to a higher order gearing for effecting carrying of the tens from order to order, whenever a numeral wheel of a lower order passes the "9" point, whether in gear with the actuating mechanism or not. The carriage comprises a supporting framework including skeleton plates 117 (Figs. 7, 8 and 13) interposed between the various orders of the accumulator and tied together by transverse tie rods 118, and a top inclosing casing 119. The carriage is both pivotally and slidably mounted on a rod 120 supported from the top of the fixed framework of the machine and is preferably constructed of a width somewhat greater than the width of the stationary casing to support a number of accumulator orders in excess of the orders of the actuating mechanism. This construction provides a machine of large capacity for multiple stroke calculation, whether positive as in multiplication or negative as in division. In the machine illustrated in the drawings there are eight columns of the actuating mechanism and fifteen columns or orders of the accumulator mechanism. Mounted on the stationary frame of the machine is a bed plate 121 provided with a series of notches or grooves 122, said grooves marking the various ordinal positions of the carriage when at rest and being adapted to co-operate with a depending lock arm 123 supported by rods 120 and 234 in the carriage which arm enters one of the grooves when the carriage has been lowered into proper registering position. The lock arm 123 is arranged between two guide plates 235, Figs. 13 and 13ᵃ forming a housing for said arm, and a spring 236 is interposed between the upper rear end 237 of the lock arm 123 and an abutment 238. At its lower end, the member 123 is formed to provide a hook 239 which engages a rod 240 to limit the upward movement of the carriage.

When the carriage is shifted by mechanism hereinafter described, such shifting causes the tapered edge 243, of the lock arm 123 to ride out of the notch 122 on the inclined sides of said notch, and as the edge 243 is riding out of the notch it elevates the carriage to disentrain the accumulator mechanism from the actuating mechanism. The edge 243 continues to ride out until the edge rides on the top surface 121 of the bed-plate, on which such edge 243 then slides until it reaches a next notch 122. During the sliding of the edge 243 on the surface 121 the carriage is maintained elevated, so that the accumulator mechanism may clear the actuating mechanism, the bushing and rod 241 engaging the surface 242 of the lock arm 123, which thus supports the carriage in elevated position to clear the mechanism of the stationary part of the machine during the shifting of the carriage until the lock arm 123 reaches and enters a next notch 122, when the tapered edge slides off the top surface 121 of the bed plate onto the inclined surface of such notch, permitting the carriage to seat. Should the lock arm fail to seat completely within the notch, spring 236 forces the lock arm 123 downwardly so that the tapered edge is moved downwardly on said inclined sides of the notch 122 and thereby draws the carriage laterally and centers it and its accumulator mechanism, in proper alignment and engagement with the actuating mechanism. The housing plates 235, aforesaid, between which the arm 123 is secured and oscillates, serve to rigidly hold the arm in vertical position, and provide vertical faces against which the lateral pressure of the arm is positively exerted, to press the carriage laterally as the spring 236 forces said arm to rock downwardly into completely centered seating in the notch 122 that it has entered. The numeral wheels 124 for registering accumulation are each provided with the usual nine digits and with the zero mark, which may be viewed through sight openings 125 in the cover plate of the carriage. The numeral wheels of the respective orders of the accumulator mechanism are mounted to rotate on cross-rods or fixed supporting shafts 126 supported by the framework of the carriage and each numeral wheel is provided with its operating gear 127 in mesh with a gear 128 mounted on a parallel cross-rod 129 (Figs. 10 and 13). Direct or indirect actuation is transmitted by the transmission gear mechanism of the accumulator to the gear 128 and the latter in turn transmits the accumulative motion to the gear 127 for rotating the numeral wheel in accordance with the incremental movement of either direct or indirect, or concurrently direct and indirect actuation.

The transmitting gear mechanism of the accumulator receives the actuation of the column actuators from the gears 114 of the internal ratchet mechanisms and transfers such actuation to the numeral wheels of the corresponding orders. It also embodies a carrying mechanism that employs the same gear transmission for effecting a carrying of the tens from lower orders to higher orders, whenever the numeral wheels of lower orders pass from "9" to "0". The carrying movement in the higher order may take place, in accordance with the mechanism of the invention, concurrently with a direct actuation of said higher order by its own corresponding column actuator without in any manner swallowing up the carrying impulse or entailing loss of carry. The accumulator mechanism of each order supported by the carriage comprises a pair of juxtapositioned combined internal and external gears 130 and 131, the external gear teeth 132 of gear 130 being in mesh with the gear 128 and the external teeth 133 of the right-hand gear 131 being in mesh with the gear 114 of the internal ratchet mechanism. The gear 131 is loosely journaled upon a stub shaft 134 supported by a skeleton plate of the carriage frame and the left-hand gear 130 is loosely journaled upon a short stub shaft 135 which passes through the hub 136 of gear 130, the hub 137 of gear 131, and is itself mounted for rotary movement in a socket 138 formed in the stationary stub shaft 134. The external teeth of gear 131 are differential with respect to the external teeth of gear 130, for example gear 131 may have thirty-six external teeth while gear 130 has forty external teeth. The internal teeth 139 of gear 131 are also differential with respect to the internal teeth 140 of gear 130, for example, gear 131 may have forty-four internal teeth 139 and gear 130 may have forty internal teeth 140. The short stub shaft 135 is concentric with the axis of rotation of the gears 130 and 131 and itself constitutes a carrier for a pair of differential epicyclic pinions 141 and 142, pinion 141 corresponding to gear 131 and meshing with its internal teeth 139 and pinion 142 corresponding with gear 130 and meshing with its internal teeth 140. The pair of differential pinions 141, 142, are fixed together and rotate about a common axis 143 that is eccentric to the axis of rotation 135 of gears 130 and 131. For example, pinion 141 may have twenty-two teeth and pinion 142 eighteen. Said pinions are journaled on the outer end of a carrier arm 144 fixedly supported by and projecting from shaft 135 in a direction transverse to its axis of rotation. The pair of differential epicyclic pinions 141, 142, constitute the interposed transmitting gearing for transmitting direct actuation from the gear 114 of the internal ratchet mechanism to the numeral wheel gear 127 of the corresponding order. The transmission of direct incremental actuation may take place while the epicyclic pinions are moving only about their axis 143 and no epicyclic movement of said pinions about the axis 135 is taking place. In fact, this is the mode of operation except when a carry is being transferred from a lower order, but the carrying transfer which involves an epicyclic movement of the pair of pinions does not disturb the work of the pinions in transmitting direct actuation by rotation on axis 143. The transmission of direct actuation is as follows: On the up-stroke of the column actuator arm the internal ratchet mechanism gear 114 is rotated for a distance sufficient to move the numeral wheel the number of numeral spaces required by the key actuated or set. The movement of gear 114 is transmitted to external gear 133 which in turn rotates internal gear 139, internal gear 139 rotates the pair of differential pinions 141, 142, pinion 141 meshing with gear 139 and pinion 142 meshing with gear 140 to rotate the latter. The rotation of gear 140 also rotates external gear 130, thereby rotating gear 128 and the numeral wheel gear 127. The gearing just described is so proportioned that external gear 132 turns a half rotation during each complete rotation of the corresponding numeral wheel gear 127 and numeral wheel 124.

The epicyclic movement of the pair of differential pinions 141, 142, is employed to receive and impart to the combined internal and external gear 130 a further one-step movement when a carry is released by the next lower order of the machine, that is when the numeral wheel of the next lower order passes between "9" and zero. The left-hand face of each combined internal and external gear 130 is provided with gear arms 145 to a projecting stud 146 of which is secured one end of the carrying spring 147 which embraces the hub 136 of the gear 130. The other end of the carrying spring 147 is secured to a hook 148 (Fig. 27) projecting from a small disk 150 mounted on the right-hand end of and rigidly secured to the stub shaft 135 of the pair of differential pinions of the next higher order. The disk 150 constitutes an escapement wheel for the carrying transfer in the next higher order, whenever a carry is to go over from a lower order. The disk 150 is provided on its periphery with one carry-storage stop-lug 153 which is adapted to retain the escapement wheel 150 against rotation and the differential pinions 141, 142, of the higher order against epicyclic movement, by the cooperation of a pair of carry-storage-retaining latches 154. Each carry-storage retaining latch is mounted on a transverse rod 155 supported by the framework of the carriage, and the two latches 154 are connected together by a curved connecting link 156 which causes both of the latches to move simultaneously when either one is moved. Each latch is provided with a curved stop arm 158 each of which makes contact with the transverse rod 155 of the other member when its detent 157 is in engagement with stop lug 153. Projecting from the free end of each latch 154 is cam lug 161 which when engaged moves its latch 154 and detent 157 away from the stop lug 153 to release the escapement wheel 150, whenever a carry is to go over from the lower to the higher order. When said latch 154 is moved to release the escapement wheel 150 it pulls the connecting bar 156 which moves the other latch 154 into position so that its detent 157 is ready to engage the released stop lug 153. This movement occurs at each one-half revolution of the lower order gear 130, at the time when the numeral wheel of said lower order is passing between the "9" point and zero. Secured to said arms 145 of said gear 130 is a curved inside guard 244 that extends around for about one-half of the perimeter of said gear 130. One end of said guard is depressed at 245 and in front of the other end of the guard 244 is a dolly-roll 246. The dolly-roll and the depressed portion are positioned oppositely with respect to the gear 130, the dolly-roll being adapted to engage and move one or the other of the cam lugs 161, and its respective latch 154 whose detent 157 is in engagement with the stop lug 153 of the higher order, at the movement of carry release. When the external gear 130 moves its numeral wheel beyond the "9" point, the guard or cam presses outward the cam lug 161 that corresponds to the detent 157 that is in engagement with the stop lug 153, and this movement causes the connecting link 156 to move the opposite cam lug 161 down into the recess 245 to hold the other detent 157 in position to move into engagement with the stop lug 153 when the numeral wheel moves to zero. The contour of the recess in the guard 244 is designed to prevent the impact of the dolly-roll 246 from releasing the detent 157 too early, by offering resistance to the opposite latch that must move in as the engaged latch is disengaged. At the instant when the gear 130 has completed one-half revolution, i. e., moved its numeral wheel to zero, the dolly-roll moves the cam lug 161 whose detent 157 is holding the stop lug 153 to release the stop lug and effect a carry, and at the same instant the guard 244 moves from under the other cam lug 161, and said other detent's latch 154 is moved so that its detent 157 will catch the released stop lug 153. During direct actuation by its own column actuator the combined internal and external gear 130 of each lower order of the machine acts as a carrying spring winding gear for the purpose of winding the carrying spring 147 to impart a carry-producing impulse to the escapement wheel 150 of the higher order. The carrying spring 147 is wound during each one-half revolution of the gear 130 between the points of carrying release by the dolly-roll and the depressed portion of the inside guard. At the moment of carry release the carrying spring 147 has power stored in it sufficient to turn the escapement wheel 150 of the higher order, to which said carrying spring is also attached, and this effects an epicyclic movement of the pair of differential pinions 141, 142, of said higher order, by reason of the turning of the carrier 135. By such epicyclic movement of the pinions 141, 142, in the next higher order, because of the differential number of teeth in the pinions themselves and in the combined internal and external gears with which said pinions mesh and cooperate, the gear 130 of the higher order is imparted a movement sufficient to actuate the numeral wheel of said higher order one extra numeral space required by the carrying transfer.

As external gear 130 receives all accumulator actuation from pinion 142, and is not in mesh with gearing other than pinion 142, gear 128 and numeral wheel gear 127, it is free to take a carry over at all times and there is no delay in transmitting a carry from a lower order to a higher order until the higher order has finished its direct actuation. In fact the carry may complete itself before the direct actuation in the higher order has been completed. A carry will go over even though a key in such next higher order is held in its lowermost depressed position. Such mechanism permitting a carry to go over and complete the transfer from a lower order to a higher order regardless of the movement or position of the mechanism in the next higher order, greatly facilitates dual actuation of various orders simultaneously in either key-driven or key-set and universal-key-driven operation of the machine.

In key-driven actuation, for mere addition or subtraction, the carriage containing the accumulator mechanism is stationary relatively to the actuating mechanism throughout the performance of the entire example, preferably with the first order of the accumulator mechanism in operative engagement with the first order of the actuating mechanism. In multiple stroke keyset universal-key-driven calculation, or if desired in individual-key-driven multiple-stroke calculation it is or may be necessary, however, to shift the carriage from order to order of the machine in order to effect the accumulation of the multiple strokes represented by each digit of one factor. For example, in performing multiplication, a multiple place factor, such as the multiplicand, would be set up by the keys 25. If the multiplier is also multiple place, the carriage may be set, first, with the units order of the carriage corresponding with the units order of the actuating mechanism, and the universal-key 56 would be depressed for a number of times corresponding to the digital value of the units place of the multiplier. After this is accomplished, the carriage is shifted and the universal-key then depressed for a number of times corresponding with the tens place of the multiplier, and so on until each ordinal digit of the multiplier is exhausted. The operation of the machine is, however, not confined to multiplying from right to left, as multiplication may be performed by starting from the left, in which case the carriage would be positioned accordingly. For shifting the carriage, there are provided at its opposite ends handles 162 so that the carriage may be first swung upwardly on its supporting rod 120 and then shifted transversely of the stationary casing of the machine, as required or may be shifted by mechanism to be hereinafter described.

The operation of lifting the carriage disengages the gears 131 of the ordinal accumulator mechanism from the gears 114 of the ordinal actuating mechanism, and this would, unless prevented, release the tension of the carrying springs 147 which are attached to the gears 130. In order to prevent the carrying springs from unwinding reversely and losing their tension, there is provided in each order of the accumulator mechanism a locking lever 163 (see Figures 13 and 14) for locking the gears 130 against movement, whenever the respective gear trains are disengaged from the actuating mechanism. The locks 163 are pivoted at their lower ends on a rod 164 secured to the several plates of the carriage frame and the upper ends of said lock levers are provided with detents 165 adapted to move into engagement with the external teeth of the gears 131, when the locks 163 are released by the lifting of the carriage. The said lock levers 163 are provided with horizontal arms 166 which engage a ledge of the bar 121 to throw the detents out of engagement with such gears as are to be engaged with the actuating mechanisms, when the carriage frame is in its lowered position. Said arms 166 are arranged between a frame plate and a folded portion 246—247 thereof, forming a guard against accidental release of the lock lever by an operator or any one else who may by accident grasp the projecting portion of the carriage to lift the machine. Said portion is provided with a slot 248 so that said guard may fit over the ledge of the bar 121. These slotted portions are provided to limit the throw of said arms 166 when they are lowered onto said ledge. When, however, the carriage is lifted springs 167 connecting the vertical arms of the levers 163 with the rod 249 are released to pull the detents 165 of said levers forwardly into locking engagement with the gears 131. As the gears 130 are not locked, even in those orders of the accumulator in which locks 163 have not been released by engagement with bar 121, the carrying transfers may nevertheless take place although such orders may not be in operative position with respect to any part of the actuating mechanism.

The invention provides a counter mechanism for registering the universal-key actuations in multiple stroke calculation, for each order of one factor of the example, for instance, the multiplier. There is provided in a series of orders of the carriage beginning with the units order a counter wheel 168 (Figs. 25 and 10) having on its face the nine digits and the "0" mark, the several counter wheels being mounted on shafts 169 supported by the upright plates of the carriage frame. The registrations of the several counter wheels are viewed through sight openings 170 in the casing plate of the carriage and located forwardly of the sight openings of the accumulator registering wheels. Each counter wheel is provided with a pair of ratchets 171 and 172 (see Figs. 25 and 26) the ratchet 171 being the driving ratchet for said wheel and the ratchet 172 the retaining ratchet for preventing backward rotation thereof. A pivoted pawl 173 impelled by a spring 174 engages the teeth of the retaining ratchet 172 for preventing backward rotation of the counter wheel 168. Each counter wheel 168 is provided with a spring 175 (see Fig. 10) encircling its hub and having one end secured to the wheel and the other at 176 to the carriage frame plate, for turning the wheel backwardly to zero, in zeroizing, as will be hereinafter explained. For actuating the counter wheels successively (see Fig. 25) there is provided in the units order of the actuating mechanism a bell crank lever 177 at the upper end of the vertical arm to which is pivoted a tooth-engaging member 178 adapted to engage the teeth of the ratchet 171. The horizontal arm 179 of the bell crank lever carries at its rear end a dolly-roll 179a which rides on the cam 180 of an actuator plate 41 secured to the oscillatory shaft 40 of the universal actuator 39. The cam 180 lifts the arm 179 of the bell crank lever during each complete downward oscillation of the shaft 40 (counter-clockwise viewing Fig. 25). As the arm 179 rises the member 178 moves upward in a clockwise direction to advance the ratchet of the counter wheel one numeral space. As the universal-actuator makes its upward oscillation to effect the actual transfer of incremental ordinal accumulation to the accumulator, (the adding actuation), the cam 180 allows the bell crank arm 179 to be swung downwardly by the spring 177a, so that the member 178 is then out of engagement with the teeth of ratchet 171. The member 178 in its normal position engages the bar 178a and does not engage the teeth but only makes contact with the ratchet when the universal actuator key 56 is in its lowered position. These operations take place successively on the counter wheels as the carriage is shifted in multiple stroke actuation.

Zeroizing mechanism is provided for restoring to zero the several orders of the accumulator mechanism and also the several orders of the counter mechanism. A zeroizing shaft 184 extends transversely through the framework of the carriage and is provided at its right-hand end with a zeroizing handle 185 (see Figs. 2 and 26) by which the shaft may be turned back and forth. The handle 185 extends beneath the cover of the carriage and in zeroizing may be pulled forwardly toward the carriage shift handle. Zeroizing shaft 184 is provided with ordinal notches 186 (see Fig. 13) within which seat the depending zeroizing release and stop levers 187 corresponding to the several orders of the accumulator mechanism. These levers are pivoted at their upper ends on a rod 188 supported by the carriage framework of the carriage and are retained in their normal positions by the springs 156 connected with the carriage frame at 250. The lower ends of said zeroizing release and stop levers project into the path of movement of the lock levers 163, and when said release levers 187 are moved rearwardly toward the left, as viewed in Fig. 13, their motion is transmitted to the lock levers 163 to push the locking detents away from engagement with the gears 131 of the accumulator trains and to release the carrying springs 147. This motion occurs whenever the carriage has been lifted and the zeroizing lever 185 concurrently pulled forward to turn the shaft 186 so that the levers 187 are forced rearwardly by the engagement of the edges of the recesses in said shaft. Inasmuch as the gears 130 and 131 are released by disengagement of gears 131 from the gears 114 the carrying springs 147 are free to turn gears 130 and with them through the other transmitting gearing all the numeral wheels backwardly to the zero point. When the numeral wheels of the accumulator mechanism have arrived at zero the reverse rotation imparted by the released carrying springs 147 is arrested to retain the numeral wheels in zero positions by means of zero stops 190 provided at diametrically opposite positions on the respective gears 130 (Figs. 13 and 27). One or the other of these stops 190 is engaged by a stop detent 191 mounted at the end of the zeroizing stop lever 192, whenever the gear 130 has been turned so that its corresponding numeral wheel 124 is at zero. The zeroizing stop levers are pivoted at their upper ends on the shaft 188 and are connected by springs 189 (Fig. 10) with the release levers 187 to form flexible bell-cranks. The lower ends of the stop levers are moved downwardly to position the stop detents 191 in the path of the stops 190, whenever the zeroizing shaft 184 is turned. A spring 196 fastened to a hook 197 (see Fig. 26) formed by hollow milling of the shaft, winds around the shaft 184 when turned in a zeroizing operation and restores the shaft and its operating handle 185 to normal.

Zeroizing of the counter wheels 168 may be effected, as disclosed in the present embodiment, concurrently with zeroizing of the accumulator wheels 124. For this purpose, a zeroizing lever 251 is mounted on a transverse rod 252 supported by the framework of the carriage and is provided with a spring 253 normally holding its forward lower end 254 in forward position as shown in Figure 26. The lever 251 has a depending arm 257 engaging a recess 186 of the zeroizing rod 184. At its forward lower end, the lever 251 is pivoted to a link 59 which is in turn pivoted at its other end to an oscillatory arm 258 secured to a counter zeroizing shaft 259. The shaft 259 is also provided with ordinal notches 260 within which seat the upwardly extending arm 261 of the spring impelled pivoted pawl 173 that engages the teeth of the retaining ratchet 172 for preventing backward rotation of the counter wheels. Operation of the zeroizing lever 185 for zeroizing, causes the zeroizing lever 251 to move rearwardly which pulls the link and oscillatory member to the rear which causes the counter zeroizing shaft to move in a clockwise direction and force the arms 261 downwardly and consequently the backstop pawls 173 downwardly against the tension of their springs so that pawls 173 are disengaged from the teeth of ratchet 172 and the counter wheels may then turn rearwardly to zero under the action of their zeroizing springs 175 (Fig. 10). When it is desired to zeroize the counter wheels without zeroizing the numeral wheels of the accumulator mechanism, depression of a key 262 whose stem is fixed in a stud 263 pivotally mounted on the zeroizing lever 251 will effect the zeroizing of counter wheels independently of the zeroizing shaft 184.

When the respective counter wheels have arrived at zero positions, their backward rotation is arrested by the zero stop pin 194 (see Figs. 10 and 25) on the ratchet 172 coming to a stop against an arm 194a loosely mounted on the hub of the counter wheel and which in turn engages a fixed stop 195, fastened to the frame of the carriage. The loose arm 194a serves as a yielding feature of the stop device on forward rotation, which may lift and not obstruct passage as the pin 194 engages it, when the counter wheel moves forwardly to the "9" position, the pin 194 being positioned nearer to the axis of shaft 169 than pin 195 to prevent interference with the full movement of the counter-wheel pin 194, the space occupied by pin 194—195 being greater than a one step movement of the counter wheel of the space between "9" and zero, and making such combination necessary.

When it is desired to shift the carriage one or more ordinal positions, such shifting may be done without requiring the operator to lift the carriage by the handle 162.

At the left-hand side of the machine (see Figs. 6 and 30) there is provided a rod 264 supported at the front of the machine in a bearing 265 and supported at the rear of the machine in a bearing 266.

A knob 267 is secured to the rod 264 at the front of the machine to facilitate turning the rod. At its rear end the rod carries a bushing 268 having a gear 269 thereon provided with gear teeth 270 that mesh with teeth 271 on a transversely extending rod 272 supported in the framework and bracketed to the carriage. The gear and its teeth are proportioned so that when the knob 267 is turned a half turn, either to the right or to the left, the gear 269 shifts the rods 272 and 120 one ordinal space, and at the beginning of such shift the tooth 243 of lock-arm 123 rides out of notch 122 and lifts the carriage to disentrain the accumulator mechanism, and said gear 269 and rod 272 simultaneously move the carriage, either to the right or left, depending on the direction the knob 267 is turned, until the tooth 243 of the arm 123 rides into another notch 122 in the bed plate 121, which allows the carriage to lower, and as the tooth 243 of the arm 123 seats in the said notch, the gears 114 and 133 again entrain (Figs. 13, 20 and 28).

The machine is also provided with a subtraction-key universal to all orders of the accumulator mechanism greater than those of the keyboard (see Fig. 14). A subtraction-key 273 is provided at the left-hand side of the machine, and its stem 274 extends through the top casing plate, and engages an arm 275 of a bell crank lever 276 which is pivoted at 277. The horizontal arm 278 of the bell crank is curved at about its center to clear the pivot shaft of the lantern wheels, and the upper portion of the arm 278 is flanged to provide a stop lug 279 which enters between the teeth of one of the gears 130, that happens to be disposed next to the highest order of the stationary ordinal column actuating mechanism when the "subtract" key 273 is depressed, to hold said gear against rotary movement that would transmit a carry to its numeral wheel. The rear end of said horizontal arm 278 is also flanged to provide a projecting edge 280 that may enter the opening in the detent guard 247 (Fig. 13) to engage and raise the edge 166a of the horizontal arm 166 of the lever 163 to withdraw the detent 165 out of locking engagement with the gear wheel 131. In subtracting, when the "Subtract" lever is depressed, and a carry is going over, the shaft 135 is rotated as usual under the influence of the spring 147, and the pinions 141 and 142 make an epicyclic movement, but instead of the gear 130 being driven, and the gear 131 being stationary, the pinion 142 walks idly around the gear teeth 140 of gear 130 which is held by the stop lug 279 (Fig. 14) and the gear 131, which is not in mesh with a gear 114 and is not held by the detent 165 because it is elevated by edge 280, thus discharging the carrying action without causing the register of a carry on the higher numeral wheel. The downward movement of the vertical arm of the bell crank is limited by the sector shaft 32 which also serves as a fastener for one end 281 of a spring 282 whose other end is fastened to the curved portion of the horizontal arm 276 and tends to draw said horizontal arm downwardly.

When the machine is set for universal-key-driven operation, it is desirable that there be no accumulative action upon setting-up the keys. In order to prevent such accumulative action, there is provided a key-board non-adding lock for key-set action. At the forward end of the machine there is provided a transversely extending, pivotally mounted bar 283 provided with (see Figs. 8, 11, 12 and 29) an arm 284 for each order of the machine, each of said arms being pivotally secured to an arm 285 of individual non-adding locks 286 by a slot and pin connection. The individual non-adding locks are bent to the left at their upper ends 293 forming a stop lug so that each stop lug is immediately under the free end of its respective column actuator 29.

A spring 287 is secured to an arm 288 that is fastened to the bar 283, and the other end of the spring 287 is secured to a non-add release device 289. This spring tends to hold the lock-bar 283, and locks 286, in position to prevent depression of the free ends of the column actuators, when the keys 25 are being depressed while the machine is set for key-set operation, and this spring 287 also tends to elevate the opposite end of the device 289. To a depending arm 290 of the release device 289 is pivotally secured a push-rod 291 that has a slotted connection with a stud 292 on said bar-arm 288. Upon setting of the keys, the locks prevent depression of the column-actuators, but when the universal key 56 is depressed the rod 223, whose rear end is connected to the sector 207 (Fig. 18), rotates the pivotally mounted disk 61 toward the front of the machine and thereby causes the dolly-roll 297 to ride a cam surface 294, which forces the rear end of the release device 289 downward and moves the bar 283 about its pivot to swing the locks 286 and these stop lugs 293 from beneath the free ends of the column actuators just before the start of the down-stroke of the column actuators, then the dolly-roll rides along a neutral curved surface 295 which maintains the locks slightly out of the path of the free ends of the column actuators until the column actuators complete their up-stroke. As the universal-key 56 and the column actuators are elevated, the dolly-roll 297 rides upwardly on the neutral surface 295 and does not ride over the cam 294 until the free ends of the column actuators are above the stop lugs 293 of the locks 286.

When the machine is set for individual-key-driven actuation, such non-adding locks are not required. Mechanism is provided to render the non-adding locks inoperative, when the machine is set for individual-key drive, a bar 298 is pivotally secured to a depending arm 299 of the walking beam 85, said bar having a slotted connection with a stud 300 on an arm 301 of the non-adding bar 283. When the "individual key-drive" key 83 is depressed said bar 298 pushes the stud toward the front of the machine to maintain the non-adding bar 283 and locks 286 away from the free ends 296 of the column actuators.

A column-lock is provided, operable in combination with key-setting or key-driving, as in universal-key-drive or individual-key-drive, said column-lock preventing depression of more than one key at a time, immediately upon the slightest key depression and before the column actuators are moved, thus preventing even a partial depression of another key in the same column until a previously depressed key has been restored to its uppermost elevated position, whether under key setting or key driving (see Figs. 15, 16 and 17). In each order of the machine is a plate 302, said plate extending from the "1" key to the "9" key, and being secured at 303a, 303b to the framework of the machine.

Each of said plates carries a plurality of slotted floating latch members 304 having a dual latching capacity. Each of the latch members 304 is pivotally supported at its upper end 305 on and by a lug 306 of the plate 302, and they are limited against upward movement by a spring latch finger 307 that allows of easy assembly of the latch members 304, and which engages their lower edge 308. The latch members are retained in their lateral relation to the frame by shoulders 309a, 309b and by T-braces 310 engaging their sides 311. The lower ends of the sides 311 extend outwardly and are connected with the bottom. The upper surface 311 of the lower ends of the sides are inclined downwardly and outwardly at 312, and each end of the bottoms are cut away at 313 to provide an upwardly extending cam surface. The vertical contacting edges 314 of the floating latches are spaced from each other just enough so that the accumulation of such spaces is just about the thickness of one of the stems 26 as viewed in Fig. 15.

When a key is depressed, the lower edge 315 of the wider part of the stem passes between the adjacent edge 314 of two adjacent floating latches and causes the floating latches at each side of the stem to move over so that all of the contacting edges 314 of the other floating latches are wedged against each other, thereby latching up all the other keys and preventing the lower edge 315 of any other key stem from passing.

Next to the "1" key stem, and the "9" key stem, fixed studs 316 are provided as stops for the end latches. When the machine is set for universal-key-actuation, and a key is set, the lower edge 315 remains between the two adjacent edges 314 of the floating wedges until the key is released by the depression of the "0" key, or the "key set release" key, or the "Individual key-drive" setting key, and setting of another key in the same column is prevented until the prior set key has been restored to its normal elevated position.

Means are provided to prevent operation of the universal-key 56, when the machine is set for universal-key-drive, if the carriage is not in its normal lowered position, i. e., when the accumulating gears and the actuating gears are not in mesh. Should the carriage be elevated as shown in Fig. 19, the beaded edge 317 of the casing 119, will force the upper end 318 of the vertical arm 319, of a bell-crank lever 320, to move about its pivot 321 thereby raising the horizontal arm 322 of the bell-crank 320 so that the forward end 323 of the arm 322 is in the path of a toe 324 that extends down from the rod 223, thereby preventing the rod 223 and the sector 207 from moving, and as the sector cannot move in such instance, neither can the key 56 or pinion 209.

When the carriage is lowered into position whereby the gears are in mesh, then the vertical arm 319 moves toward the rear of the machine and the horizontal arm 322 moves downwardly so that the stop 323 is out of the path of movement of said toe 324 (see Figs. 5 and 18).

Through the medium of the same blocking lever 320 a lock is effected to prevent the raising or shifting of the carriage while the universal-key 56 is depressed. This is accomplished by the circular lip 325 of the lever 320 (one end of which forms the stop 323) over which the toe 324 rides when the universal-key 56 is depressed and which holds the lever 320 from movement that would release the beaded edge 317 of the carriage casing 119. Thus while the universal-key 56 is depressed the beaded edge 317 of the carriage casing 119, and consequently the carriage, is held down by the depression in the upper end 318 of the lever 320, and as the carriage must rise before it may be shifted, it is thus also held against shifting.

Novel features shown but not claimed herein form the subject matter of my co-pending applications Serial No. 620,507, filed July 1, 1932, Serial No. 621,196, filed July 7, 1932, for Calculating machines.

The invention is hereinabove set forth as embodied in a particular form of construction but may be variously embodied within the scope of the claims hereinafter made.

I claim:—

1. In a calculating machine having a pivotally mounted, longitudinally shiftable carriage containing accumulator mechanism that operatively meshes with actuating mechanism contained in the stationary part of the machine: a bed plate having sloped notches therein corresponding to each order of the machine and into which a centering device seats to center the operative parts, a rod connected and movable with the carriage and having teeth thereon, a pinion having teeth thereon in meshing engagement with the teeth of the rod, and means for turning said pinion, whereby when said pinion is turned in either direction said rod shifts said carriage laterally, and such lateral shifting first causing said centering device to ride up a slope of the notch engaging it and thereby raising said carriage and said accumulator mechanism out of meshing engagement with the actuating mechanism, said carriage being thereafter lowered into meshing engagement with the actuator mechanism when the centering device enters the next notch.

2. In a calculating machine: a series of gear wheels; an endwise shiftable pivoted carriage having a series of gear wheels engaging the first named wheels; a bed plate member having a series of notches therein; a bed plate cooperating member adapted to seat in said notches and to be in engagement with the portions of the bed plate between said notches during relative movement of said members lengthwise of the series of notches; one of said members being independent of and fixed relative to said carriage and the other of said members being fixed to said carriage and movable therewith lengthwise of and relative to the one member; the said member that is fixed to and movable with the carriage being adapted to move transversely of the member that is fixed relative to the carriage upon mere movement of the carriage in a direction lengthwise of its pivot and thereby elevate the said carriage and its gear wheels out of engagement with the first named gear wheels while the bed plate cooperating member is in engagement with the portions of the bed plate between the notches therein; and means for moving said carriage and the member that is fixed thereto in a direction lengthwise of the pivotal axis of the carriage.

3. In a calculating machine: a series of gear wheels; an endwise shiftable pivoted carriage having a series of gear wheels engaging the first named wheels; a bed plate having a series of notches therein corresponding to the first named series of wheels and fixed relative to the carriage; a bed plate cooperating member fixed to said carriage and adapted to seat in said notches to effect engagement of the first named wheels with the second named wheels and to be in engagement with the portions of the bed plate between said notches to hold said carriage elevated about its pivot and thereby hold said first and second named wheels out of engagement during endwise shifting of said carriage; said bed plate cooperating member being adapted to move transversely of the bed plate and out of the respective notches upon mere movement of the carriage in a direction lengthwise of its pivot and thereby elevate the carriage and its gear wheels out of engagement with the first named gear wheels; and means for moving the carriage in a direction lengthwise of its pivotal axis.

4. In a calculating machine, in combination: a carriage containing accumulator mechanism; a key-drive and a key set universal drive including actuating mechanism for said accumulator; a device for shifting the carriage; and unitary locking means cooperatively connected as a unit with key driven mechanism, the carriage, and the universal drive mechanism and controlled by the latter in such manner that shifting of the carriage may occur only while the universal drive is at normal and key-driven operation of the actuating means is prevented while the universal drive is at normal, whenever the machine is set for key set operation.

5. In a calculating machine having a lifting and shiftable carriage containing accumulator mechanism entrainable with actuating mechanism contained in a stationary portion of the machine and having a key drive and a universal drive mechanism for the actuating mechanism: means operable to lift said carriage to disentrain said mechanism and at the same movement to shift said carriage past the mechanism of the stationary portions of the machine to another order and there to lower the carriage to entrain said accumulator mechanism with said key actuating mechanism; and unitary locking means controlled by the universal drive for locking the actuating mechanism against key-driven operation while the universal drive is at normal and for locking the carriage against shifting whenever the universal drive is in operation.

6. In a calculating machine having an accumulator mechanism carriage; a key-drive and a key-set universal drive for said actuating means; and unitary locking means controlled by the universal drive and cooperating as a unit therewith and with said actuating means and carriage, when the machine is set for key-set universal drive operation, to prevent key-driven operation of the actuating means and operation of the universal drive when the carriage is out of registering position and also to lock the carriage while the universal drive is in operation, said locking means being automatically held out of operation when the machine is under key-driven operation.

7. In a calculating machine having an accumulator-mechanism carriage and having means for an individual key drive and a key-set universal-drive, a lever pivoted on the machine and adapted to engage the carriage for holding the same against tilting and lateral movement and to be maintained in such relationship by the universal drive while the machine is operated by the universal drive, said lever being automatically maintained free of the universal drive for such tilting and lateral movement, during individual key driving of the machine, by the setting of the machine for individual key drive operation; unitary locking means cooperatively connecting the carriage with the key-driven mechanism and the universal-key actuated mechanism respectively in such manner that the carriage is shiftable only while the individual keys are at normal and their key driven mechanism locked when the machine is set for key-driven operation, and is shiftable irrespectively of whether the individual keys are at normal or depressed but only while the universal key is at normal, when the machine is set for key-set operation.

8. A calculating machine having mechanism including a key for effecting universal actuation of the machine, said mechanism consisting of mechanical means arranged so that it responds solely to the mere finger depression of said key; the universal key having an initial and return stroke of short and constant amplitude and having its connections with the column actuator mechanism freed from tensions imposed during individual key-driven actuation, so that resistance to the stroke of the universal key during key-set actuation is minimized.

9. In a calculating machine, in combination: ordinal accumulator mechanism; ordinal actuating mechanism therefor; mechanism for effecting universal actuation of said ordinal actuating mechanism and having a pitman device; a depressible key operated by mere finger pressure, and means connecting the key with said pitman device to give motion thereto and thus in turn give the universal actuation.

10. A calculating machine having alternatively operable key-driven column-actuator mechanism and key-set mechanism for effecting universal actuation thereof; a rod having a pinion thereon; levers operatively connecting said rod and the universal actuator mechanism; a gear sector operatively engaging said pinion, said gear being secured on a stub shaft; a depressible key secured to said stub shaft, and a spring secured to said stub shaft for returning said mechanisms to their normal positions; the means for universal actuation of the column actuator mechanism during key-set operation being adapted to be freed from tensions imposed during individual key-driven actuation, so that resistance to the universal actuation means is minimized.

11. In a calculating machine operable for key-set universal-key driven actuation; an actuator shaft; actuator plates thereon; column actuator levers; spring means connecting said column actuators and said actuator plates; a power transmitting shaft; an arm secured to one end of said shaft; a plurality of connected oscillatable levers, one of said levers being connected to said arm and the other being secured to said universal actuator shaft; a pinion on the other end of said power shaft; a gear sector in meshing engagement with said pinion, said gear sector being mounted on a stub shaft; a universal-key mounted on said stub shaft for driving said mechanism; and means for restoring said mechanisms to normal when said key is relieved of pressure.

12. In a calculating machine, in combination: alternatively key-driven and key-set calculating mechanism; a universal depressible key operable by mere finger pressure for actuating any or all orders of said mechanism, and digital devices for controlling the digital values and denominations to be actuated by said key; the means for universal actuation of the column actuator mechanism during key-set operation being adapted to be freed from tensions imposed during individual key-driven actuation, so that resistance to the universal actuation means is minimized.

13. A calculator having multiple order denominations of accumulator mechanism and alternatively operable key-driven and key setting devices controlling digital degrees of actuation in the various denominations, means for universally operating various or all of the denominations according to their set digital values, and a manually operated device consisting of a depressible finger-key to supply the power for said universal actuations; the means for universal actuation of the column actuator mechanism during key-set operation being adapted to be freed from tensions imposed during individual key-driven actuation, so that resistance to the universal actuation means is minimized.

14. In a calculating machine: means for effecting alternatively-key-driven and key-set universal actuation therein, said means including a universal-actuator shaft, a driven member, levers connecting said driven member with said universal actuator shaft, a driving member operatively connected with said driven member, and a depressible finger-key for operating said driving member; the means for universal actuation of the column actuator mechanism during key-set operation being adapted to be freed from tensions imposed during individual key-driven actuation, so that resistance to the universal actuation means is minimized.

15. In a calculating machine alternatively operable for individual-key drive or key-set universal-key drive; manually controlled means for setting the machine for either drive; a universal-key; a gear sector operatively connected with said universal-key; an arm connected to said gear sector; a rod movable into position to prevent movement of said arm upon setting the machine for individual-key drive; whereby to prevent movement of said arm and said gear and universal-key when the machine is set for individual-key-driven actuation.

16. In a calculating machine alternatively operable for individual-key drive or universal-key drive; means for setting the machine for either drive; a depressible and reciprocable universal key; a reciprocatory rod and an oscillating sector operatively connected with and operable by said universal-key; and means movable into the path of said sector upon setting the machine for individual-key drive for preventing operation of said universal-key.

17. A calculating machine having column actuator mechanism, a key controlled individual key drive mechanism, a key set universal drive mechanism, and a depressible finger-key to operate the universal drive mechanism, the mechanism for universal drive of the column actuator mechanism during key-set operation being adapted to be freed from tensions imposed during individual key-driven actuation, so that the resistance to the universal actuation means is minimized.

18. In a calculating machine having a shiftable carriage, in combination: gear mechanism in the carriage and normally meshing with gear mechanism in the stationary body of the machine; a flexible centering-device, and a centering-plate having bevel-sided notches of substantially the same contour as the centering device said flexible centering device being subjected to the weight of the carriage while seated in said notches, to make the gears of the mechanism in the carriage center with those in the stationary frame and to cause true seating of the centering device even though variations in the depths of the centering notches occur in the plate.

19. A calculating machine having a pivotally mounted shiftable carriage containing caluculating mechanism entrainable with calculating mechanism contained in a stationary portion of the machine; a centering device for facilitating entraining of said mechanisms, said device including an arm carried at the pivotal axis of the carriage; guides housing said arm; a spring interposed between the rear of said arm and said carriage, whereby the centering device is pressed to its seat by the weight of the carriage on said spring at each lateral positioning of the carriage and thereby definitely centers the carriage at its proper position.

20. A calculating machine having a lifting and shifting carriage containing calculating mechanism entrainable with calculating mechanism contained in a stationary portion of the machine; a centering device for centering said mechanisms at different stations during such entraining; said device comprising a member of substantially the same contour as its station for definitely aligning said mechanisms, an expansible spring tending to press said member into its proper seating and under pressure of the weight of the carriage at each centering position.

21. A calculating machine comprising in combination: a lifting and shifting carriage carrying accumulator mechanism and a centering device; a stationary portion containing actuating mechanism and supporting a bed-plate having ordinal notches therein; said centering device having a portion fitting into said notches and of substantially the same contour as said notches; and a spring interposed between said centering device and a portion of said carriage and under pressure of the weight of the carriage when said centering device is fitted into said notches.

22. A calculating machine comprising in combination: a lifting and shifting carriage carrying calculating mechanism and a centering device; a stationary portion containing calculating mechanism and supporting a bed-plate having ordinal bevel-sided notches therein; said centering device having a portion fitting into said notches; and a spring interposed between said centering device and a portion of said carriage so as to be under pressure of the weight of said carriage when said centering device fits in said notches, and thereby tending to press said centering device into said notches to definitely center said carriage at each ordinal position to which it is shifted.

23. In a calculating machine having a shiftable carriage containing ordinal accumulator mechanism, and having a stationary body containing a lesser number of orders of ordinal actuating mechanism: a subtraction-key universal to all orders of the accumulator mechanism of higher order than those of the actuating mechanism and having means for engaging the teeth of a wheel of said accumulator mechanism.

24. In a calculating machine having a number of orders of ordinal actuating mechanisms and a greater number of orders of ordinal accumulator mechanisms: a laterally shiftable carriage carrying said accumulator mechanism, a subtraction-key universal to all orders of the accumulator mechanisms of higher order than the orders of actuating mechanism being used in subtracting.

25. A structure as claimed in claim 23 in which the subtraction-key operates a stop to prevent zeroizing of the orders of accumulator mechanisms of higher order than the orders of the actuating mechanism, at the time that it also operates a detent to permit the loss of a tens-carrying movement coming from the highest order of the actuating mechanism.

26. A structure as claimed in claim 24, in which the subtraction-key operates a stop to prevent zeroizing of the orders of accumulator mechanisms of higher order than the orders of the actuating mechanisms being used in subtracting, at the same time that it also operates a detent to permit the loss of a tens-carrying movement coming from the highest of said orders of actuating mechanisms.

27. In a calculating machine having accumulator mechanisms mounted in a movable carriage: a manually operated device engaging a gear on said accumulator mechanisms to prevent a carry from being registered in one or more orders thereof.

28. In a calculating machine having accumulator mechanism mounted in a shiftable carriage, said accumulator including carrying wheels: a manually operated device mounted in the stationary portion of the machine and engaging a gear on a selected one of variable orders of the carrying wheels to prevent a carry from taking place.

29. In a calculating machine: a number of ordinal actuating mechanisms; a greater number of ordinal accumulator mechanisms; said accumulator mechanisms being borne by a carriage transversely movable relatively to the actuating mechanism; a tens-carrying mechanism in each order of the accumulator mechanism; said tens-carrying mechanism comprising a pair of differential epicyclic gears in each order, means in each order for swinging the differential epicyclic gears in the next higher order through an arc of relatively large amplitude, to convey a carry impulse, and other gears in the higher order engaging said differential epicyclic gears to produce movement of the higher order numeral wheel through the relatively small amplitude of a single carry step in consequence of the differential nature of the epicyclic gearing; a subtraction lever; said lever having detents, one of which is operable to permit the differential gears in the higher order to swing through an arc of relatively large amplitude while at the same time another of said detents on said lever operates to prevent said other gears in said higher order from producing movement of the higher order numeral wheel through the relatively small amplitude of a single carry step.

30. In a calculating machine: column actuators alternatively operable for individual-key driven actuation or key-set universal actuation; means for setting the machine for either mode of operation; non-add lock means disposed in the path of the column actuators when the machine is set for key-set universal-actuation; said means preventing movement of the column actuator upon setting up the keys; and means rendered operative by the movement of the universal actuator for moving said locks out of the path of the column actuators; said means maintaining said locks out of the path of the column actuators only during the completion of a universal actuation; the means for universal actuation of the column actuator mechanism during key-set operation being adapted to be freed from tensions imposed during individual key-driven actuation, so that resistance to the universal actuation means is minimized.

31. In a calculating machine: column actuators alternatively operable for individual-key driven actuation or key-set universal actuation; means for setting the machine for either mode of operation; non-add lock means disposed in the path of the column actuators when the machine is set for key-set universal-actuation; said means preventing movement of the column actuator upon setting up the keys; and means rendered operative by the movement of the universal actuator for moving said locks out of the path of the column actuators; said means maintaining said locks out of the path of the column actuators only during the completion of a universal actuation; and means maintaining said locks out of the path of the column-actuators while the machine is set for individual-key drive; the means for universal actuation of the column actuator mechanism during key-set operation being adapted to be freed from tensions imposed during individual key-driven actuation, so that resistance to the universal actuation means is minimized.

32. In a calculator operable either by individual key drive or key-set universal drive; of a manually operative determining device to arrange the mechanism for either type of drive and a removable stop for each key to prevent key-actuation of the actuating means during setting thereof by the keys for universal driven operation when the machine is set for key-set universal drive.

33. In a calculating machine: column actuators alternatively operable for individual-key driven actuation or for key-set universal actuation; ordinal columns of keys adapted to drive said column actuators or to set said column actuators for universal actuation; universal actuator mechanism adapted to actuate one or more of said column actuators in unison; mechanism for setting the machine for individual-key-driven actuation or for key-set universal-actuation; mechanism restraining movement of said column actuator upon setting-up of said keys when the machine is set for universal-actuation; means moving said last mechanism upon operation of the universal actuating mechanism to permit movement of the column actuators; and mechanism operated by the setting of the machine for individual-key-driven actuation for preventing said mechanism from restraining the column actuators.

34. A structure as claimed in claim 33; in which the means restraining movement of the column actuators comprises spring controlled, pivotally mounted members that engage said column actuators; and in which the means for moving them upon operation of the universal actuator mechanism consists of a rod connected to the universal actuator and to an oscillatory member, said member when oscillated engaging and moving a spring controlled depressible member having a cam surface, said depressible member being connected to the means that restrains movement of the column actuator so that when the depressible member is depressed it first moves and then maintains said means for restraining movement in position to permit said column actuators to complete their actuating movement.

35. In a calculating machine: column actuators; universal actuator mechanism; keys for driving said column actuators individually; said keys being adapted to set said column actuator for operation by the universal actuators; and means preventing additive movement of the column actuators by the setting of the keys for universal driven operation.

36. In a calculating machine: column actuators; universal actuator mechanism; control keys for setting the column actuators for universal actuation or for driving said column actuators individually; and locks disposed in the path of said column actuators to prevent their movement when the keyboard keys are being set for setting the column actuators for universal actuation; and means for maintaining said locks out of the path of the column actuators during the driving of said column actuators individually by the control keys.

37. In a calculating machine: column actuators; universal actuator mechanism; control keys for driving said column actuators individually or for setting the column actuator for movement by the universal actuator mechanism; locks restraining movement of the column actuators during the setting thereof by the keys for universal actuation under key-set action; and means freeing said column actuators of said locks while the universal actuator mechanism is operating.

38. In a calculating machine: column actuator alternatively operable for individual-key driven actuation or key-set universal actuation; and a removable lock for the actuator for preventing individual-key driven actuation thereof by the keys during the setting of the actuators by the keys for key-set universal actuation.

39. In a calculating machine: accumulator mechanism, column actuators connected therewith and alternatively operable for individual key-driven actuation or key-set universal actuation; a lifting accumulator carriage mounted to traverse said column actuators; a single universal key arranged and reciprocable upward and downward at the side of the machine for operating said actuator mechanism; means preventing individual-key driven actuation while the machine is operating for key-set universal actuation; universal actuating devices for moving one or more of said column actuators in unison; and locking means operated by the carriage when lifted for locking said universal-key; the means for universal actuation of the column actuator mechanism during key-set operation being adapted to be freed from tensions imposed during individual key-driven actuation, so that resistance to the universal actuation means is minimized, and the locking means being arranged and adapted to cooperate with such light-action universal-actuation means without interference with the key-driven actuation means.

40. A structure as claimed in claim 39 in which the locking means consists of a bell-crank lever, one arm of which prevents movement of the universal actuating devices.

41. In a calculating machine: a lifting carriage; ordinal actuating mechanism; a universal-key driven mechanism for actuating one or more of said ordinal actuating mechanisms in unison; alternatively operable individual keys for directly driving said ordinal actuating mechanism; and means for locking the universal-key when the carriage is lifted; unitary locking means cooperatively connecting the carriage with the key-driven mechanism and the universal key actuated mechanism respectively in such manner that the carriage is free of the carriage locking means for shifting only while its accumulator mechanism is disconnected from the key driven actuator mechanism, when the machine is set for key-driven operation; and is shiftable irrespectively of whether the individual keys are at normal, when the machine is set for key-set operation.

42. In a calculating machine: ordinal column actuator mechanism; ordinal accumulator mechanism; keys for driving said column actuators; said keys being adapted for key-setting said column actuators; a depressible and reciprocable universal-key adapted to actuate one or more of said column actuators when the keys are set; means for setting the machine for key-set universal-key driven actuation or individual-key driven actuation; and means rendered operative upon setting of the machine for individual-key driven actuation for locking said universal-key.

43. A structure as claimed in claim 42 in which the means for locking the universal-key when the machine is set for individual-key driven actuation consists in a rod connected with the universal-key for reciprocation therewith, and in which another rod that is connected with means for setting the machine for either mode of operation is projected into the path of said reciprocatory rod to prevent its reciprocation.

44. In a calculating machine having means for individual-key driven actuation and key-set universal-key-driven actuation; column actuators, a non-adding lock adapted to prevent additive key-action of individual-keys and actuators during key-set universal-key driven operation and a universal key having means for operating said actuators and connected with and adapted to release said lock.

45. In a calculating machine the combination of an accumulator, column actuators having means for actuating the wheels of said accumulator, keys whereby said actuators may be set, column locks releasable by said keys and holding the actuators in normal position, a shaft and actuator plates thereon having yieldable connections with said actuators, and a universal key arranged at the side of said machine and reciprocable downward and upward and having means for oscillating said shaft.

46. A calculating machine having in combination a series of column actuators, a series of finger keys for operating each actuator, locks for holding the actuators from additive movement, said locks being engageable and releasable by a non-additive movement of said keys, mechanism having yielding connections with said actuators for giving additive movement to such of them as are released, and accumulating means operable by the actuators, the said connections with the locked actuators yielding to permit the operation of said mechanism.

47. A calculating machine having, in combination: a lifting and shiftable carriage containing accumulator mechanism connectable with actuating mechanism contained in a stationary portion of the machine; a key drive and universal drive mechanism for the actuating mechanism; means for lifting and shifting the carriage; carriage locking means operable by the universal drive to lock the carriage during operation of such drive; non-add locking means for locking the actuating mechanism against key-driven operation when the machine is set for universal drive operation; and unitary locking means operating as a unit with respect to said carriage locking means and said non-add locking means; said non-add locking means being thereby controlled by the universal drive to release only when the carriage is locked by the carriage locking means.

48. A calculating machine having, in combination: a lifting and shiftable carriage containing accumulator mechanism connectable with actuating mechanism contained in a stationary portion of the machine; a key drive and universal drive mechanism for the actuating mechanism; means for lifting and shifting the carriage; carriage locking means operable by the universal drive to lock the carriage during operation of such drive; non-add locking means for locking the actuating mechanism against key-driven operation when the machine is set for universal drive operation; and unitary locking means operating as a unit with respect to said carriage locking means and said non-add locking means; said non-add locking means being releasable for their operation to release the actuating mechanism by the carriage locking means through said unitary locking means when the carriage is locked by the carriage locking means.

JOSEPH A. V. TURCK.